United States Patent
Isono

(10) Patent No.: US 9,205,825 B2
(45) Date of Patent: Dec. 8, 2015

(54) ELECTRIC BRAKE APPARATUS FOR VEHICLE

(75) Inventor: Hiroshi Isono, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 212 days.

(21) Appl. No.: 13/700,010

(22) PCT Filed: Jun. 8, 2010

(86) PCT No.: PCT/JP2010/060000
§ 371 (c)(1),
(2), (4) Date: Nov. 26, 2012

(87) PCT Pub. No.: WO2011/155074
PCT Pub. Date: Dec. 15, 2011

(65) Prior Publication Data
US 2013/0105254 A1    May 2, 2013

(51) Int. Cl.
*F16D 55/08* (2006.01)
*B60T 13/74* (2006.01)
(Continued)

(52) U.S. Cl.
CPC ............. *B60T 13/745* (2013.01); *B60T 13/588* (2013.01); *B60T 13/741* (2013.01); *F16D 65/18* (2013.01);
(Continued)

(58) Field of Classification Search
CPC ..... F16D 65/18; F16D 65/20; F16D 2121/24; F16D 2121/06; F16D 2125/40; B60T 13/588; B60T 13/66
USPC ................................................ 188/72.1–72.3
See application file for complete search history.

(56) References Cited

U.S. PATENT DOCUMENTS 3,232,387 A * 2/1966 Meier et al. ................... 188/71.8
4,050,548 A * 9/1977 Margetts ....................... 188/71.8
(Continued)

FOREIGN PATENT DOCUMENTS

JP    2002 213507    7/2002
JP    2006 213080    8/2006
(Continued)

OTHER PUBLICATIONS

International Search Report Issued Aug. 10, 2010 in PCT/JP10/60000 Filed Jun. 8, 2010.

*Primary Examiner* — Robert A Siconolfi
*Assistant Examiner* — James Hsiao
(74) *Attorney, Agent, or Firm* — Oblon, McClelland, Maier & Neustadt, L.L.P.

(57) ABSTRACT

An electric caliper includes an electric drive mechanism which generates a pressing force for pressing a friction pad against a disc rotor, and a retraction mechanism provided in a piston of a pressing mechanism. The mechanism includes a reversing member which is compressed by a force transmission portion and a pressing portion of the piston to thereby generate a reverse force. Also, the mechanism includes a movable element which relatively retracts due to the reverse force, and a first elastic member which is compressed by the movable element and the advancing force transmission portion to thereby apply a restoring force. Thus, in the mechanism, the reversing member generates the reverse force as a result of advancement of the force transmission portion, and the movable element relatively retracts due to the reverse force and compresses the first elastic member. When free rotation (no-load rotation) of a brake motor of the mechanism is permitted, the restoring force generated as a result of compression of the first elastic member is applied to the force transmission portion, whereby the piston is retracted.

17 Claims, 19 Drawing Sheets

(51) Int. Cl.
*B60T 13/58* (2006.01)
*F16D 65/18* (2006.01)
*F16D 121/24* (2012.01)
*F16D 127/02* (2012.01)
*F16D 123/00* (2012.01)
*F16D 125/40* (2012.01)
*F16D 121/06* (2012.01)

(52) U.S. Cl.
CPC ......... *F16D 2121/06* (2013.01); *F16D 2121/24* (2013.01); *F16D 2123/00* (2013.01); *F16D 2125/40* (2013.01); *F16D 2127/02* (2013.01)

(56) References Cited

U.S. PATENT DOCUMENTS

| | | | | |
|---|---|---|---|---|
| 4,336,746 | A * | 6/1982 | Morith | 92/130 B |
| 4,378,863 | A * | 4/1983 | Baum | 188/71.8 |
| 4,662,483 | A * | 5/1987 | Boeck | 188/72.3 |
| 4,820,946 | A * | 4/1989 | Gutbrod | 310/77 |
| 4,958,654 | A * | 9/1990 | Hoffman et al. | 137/72 |
| 5,035,305 | A * | 7/1991 | Lammers | 188/71.5 |
| 6,328,137 | B1 * | 12/2001 | Rancourt | 188/18 A |
| 7,104,364 | B2 * | 9/2006 | Godlewsky et al. | 188/1.11 L |
| 7,559,413 | B2 * | 7/2009 | Haffelder et al. | 188/72.8 |
| 2003/0042084 | A1 * | 3/2003 | Kawase et al. | 188/72.1 |
| 2006/0001316 | A1 * | 1/2006 | Tachiiri et al. | 303/191 |
| 2010/0193299 | A1 * | 8/2010 | Certo et al. | 188/72.3 |
| 2011/0094834 | A1 * | 4/2011 | Burgoon et al. | 188/72.3 |
| 2011/0162918 | A1 | 7/2011 | Isono et al. | |
| 2012/0324882 | A1 * | 12/2012 | Mori | 60/545 |

FOREIGN PATENT DOCUMENTS

| | | |
|---|---|---|
| JP | 2008 57642 | 3/2008 |
| WO | WO 2010/029768 A1 | 3/2010 |

* cited by examiner

ELECTRIC BRAKE APPARATUS FOR VEHICLE

TECHNICAL FIELD

The present invention relates to an electric brake apparatus for a vehicle which includes a brake rotation body which rotates unitarily with a wheel, and an electric caliper which presses a brake friction member against the brake rotation body through use of electrical power.

BACKGROUND ART

Conventionally, there have been known an electric brake control apparatus and an electric brake control method as disclosed in, for example, Japanese Patent Application Laid-Open (kokai) No. 2008-57642. In the conventional electric brake control apparatus and electric brake control method, when a brake friction body satisfies a condition set in advance, the amount of electricity supplied to an electric motor is controlled such that the electricity supply amount gradually decreases between a preset first electricity supply amount and a second electricity supply amount smaller than the first electricity supply, and a standby position of the brake friction body is set on the basis of the rotational speed of the electric motor during the period in which the electricity supply amount is controlled to decrease gradually. Thus, occurrence of dragging between the brake rotation body and the brake friction body is restrained.

Also, there has been conventionally known an electric brake apparatus as disclosed in, for example, Japanese Patent Application Laid-Open (kokai) No. 2002-213507. This conventional electric brake apparatus includes contact detection means for detecting contact between a brake friction member and a brake rotation body in non-braking periods; and contact prevention means for driving electrical actuating means in a direction for separating the brake friction member from the brake rotation body by a predetermined amount when the contact detection means detects contact between the brake friction member and the brake rotation body. Thus, occurrence of a brake dragging phenomenon is prevented.

Moreover, there has been conventionally known an electric brake apparatus as disclosed in, for example, Japanese Patent Application Laid-Open (kokai) No. 2006-213080. This conventional electric brake apparatus includes an actuator which generates a braking force through use of an electric motor; a thrust sensor, a rotational angle sensor, and a motor temperature sensor attached to this actuator; and a drive control apparatus which uses, as a part of input signals, signals output from these sensors so as to drive and control the actuator. The thrust sensor of this conventional electric brake apparatus is disposed at a portion where distortion is produced due to thrust force of a piston.

DISCLOSURE OF THE INVENTION

Incidentally, in the conventional electric brake control apparatus and method disclosed in Japanese Patent Application Laid-Open No. 2008-57642 and the conventional electric brake apparatus disclosed in Japanese Patent Application Laid-Open No 2002-213507, in order to prevent occurrence of a dragging phenomenon between the brake rotation body and the brake friction body (the brake friction member) in non-braking periods, the brake rotation body and the brake friction body are separated from each other by driving and controlling the electric motor or the electrical actuating means. In this case, in order to prevent a drop in responsiveness at the time of braking, a proper clearance must be maintained between the brake rotation body and the brake friction body.

However, in the conventional electric brake control apparatus and method and the conventional electric brake apparatus, in order to secure a proper clearance between the brake rotation body and the brake friction body, it is necessary to finely drive the electric motor or the electrical actuating means by controlling, for example, an inverter circuit or the like as in the case of driving the electric motor or the electrical actuating means at the time of braking. Therefore, the drive control becomes complex and troublesome. Also, since electric power must be supplied to the electric motor or the electrical actuating means so as to secure the clearance, there remains room for improvement from the viewpoint of energy saving.

The present invention has been accomplished in order to solve the above-described problems, and its object is to provide an electric brake apparatus which properly returns a brake friction member by means of a simple structure, to thereby restrain occurrence of a dragging phenomenon between a brake rotation body and the brake friction member.

In order to achieve the above-described object, the present invention provides an electric brake apparatus for a vehicle comprising a brake rotation body which rotates together with a wheel; and an electric caliper which includes a piston for pressing a brake friction member, facing a frictional sliding surface of the brake rotation body, toward the frictional sliding surface, a cylinder accommodating the piston such that the piston can advance and retract, and electric drive means for applying to the piston a pressing force for pressing the brake friction member. The electric brake apparatus is characterized by comprising free rotation permission means for permitting free rotation of an electric motor which constitutes the electric drive means and which generate the pressing force for advancing the piston; and retraction means including reversing means for reversing the pressing force applied to the piston by the electric drive means so as to provide a reverse force which acts in a retraction direction of the piston, wherein, when free rotation of the electric motor generating the pressing force is permitted by the free rotation permission means, the retraction means retracts the piston having advanced so as to press the brake friction member, through use of the reverse force provided by the reversing means. In this case, specifically, for example, the free rotation permission means permits free rotation of the electric motor upon cancellation of a brake operation for pressing the brake friction member toward the frictional sliding of the brake rotation body; and the retraction means is configured such that, when free rotation of the electric motor is permitted by the free rotation permission means upon cancellation of the break operation, the retraction means retracts the piston having advanced to press the brake friction member, through use of the reverse force provided by the reversing means.

In this case, preferably, the piston is composed of a force transmission portion to which the pressing force generated by the electric drive means is transmitted, and a pressing portion which presses the brake friction member; the reversing means is disposed between the force transmission portion and the pressing portion, and, when free rotation of the electric motor generating the pressing force is permitted by the free rotation permission means, the retraction means unitarily retracts the force transmission portion and the pressing portion, which have advanced so as to press the brake friction member, by applying to the force transmission portion the reverse force provided by the reversing means.

In these cases, preferably, the reversing means is viscoelastically deformed by advancement of the piston, whereby the reversing means reverses the pressing force to provide the reverse force.

In these cases, preferably, the retraction means includes reverse force transmission means for transmitting the reverse force provided by the reversing means in the retraction direction of the piston, and restoring force application means which is deformed by the reverse force transmission means as a result of advancement of the piston by the pressing force and which applies to the piston a restoring force generated as a result of the deformation. In this case, preferably, the restoring force application means is formed of an elastic material which is compressed and elastically deformed by the reverse force transmission means as a result of advancement of the piston by the pressing force.

Preferably, the retraction means further includes deformation maintaining means for maintaining the deformation of the restoring force application means when free rotation of the electric motor generating the pressing force is permitted by the free rotation permission means. In this case, preferably, the deformation maintaining means is provided on the reverse force transmission means and generates a friction force for maintaining the transmission of the reverse force by the reverse force transmission means.

By virtue of these configurations, when free rotation (no-load rotation) of the electric motor which constitutes the electric drive means is permitted by the free rotation permission means, the retraction means can properly return the advanced piston (the force transmission portion and the pressing portion) by a predetermined amount (retraction amount) through use of the reverse force which is provided by the reversing means by reversing the pressing force generated by the electric motor.

Specifically, when a driver cancels the brake operation, the free rotation permission means can permit free rotation (no-load rotation) of the electric motor by, for example, cutting off the electric power supplied to the electric motor. In the retraction means, the restoring force application means, which has been compressed by the reverse force transmission means as a result of transmission of the reverse force from the reversing means to the reverse force transmission means, applies its restoring force to the piston (the force transmission portion). Thus, the piston (the force transmission portion and the pressing portion) can be retracted by a predetermined amount (retraction amount).

As a result, the brake friction member can be separated from the frictional sliding surface of the brake rotation body by an amount corresponding to a proper clearance. Therefore, occurrence of undesirable contact (dragging phenomenon) between the brake rotation body and the brake friction member can be restrained reliably. Also, since the electric motor is not required to be separately controlled in the reverse direction in order to retract the advanced piston (the force transmission portion and the pressing portion), the drive control of the electric motor can be simplified. Also, since the advanced piston (the force transmission portion and the pressing portion) can be retracted by the reverse force and the restoring force mechanically generated by the retraction means, it is unnecessary to supply electric power to the electric motor, whereby energy saving can be achieved.

Also, the reverse force (retraction stroke) can be applied to the reverse force transmission means through deformation of the reversing means caused by advancement of the piston (the force transmission portion and the pressing portion). The reverse force transmission means can reliably compress the restoring force application means in cooperation with the piston (the force transmission portion). Accordingly, the restoring force application means can be deformed elastically and efficiently through use of the reverse force. As a result, it is possible to reliably generate the restoring force so as to retract the advanced piston (the force transmission portion and the pressing portion).

Another feature of the present invention resides in that the above-described electric brake apparatus for a vehicle is used as an electric parking brake apparatus which operates when the vehicle is parked or stopped so as to brake rotation of the wheel.

In this case, preferably, the electric brake apparatus is configured as follows. The electric brake apparatus includes brake hydraulic pressure supply means for supplying a brake fluid to the cylinder of the electric caliper so as to increase or decrease a brake hydraulic pressure within the cylinder to thereby apply a hydraulic pressing force to the piston. When the brake rotation body rotates together with the wheel, the piston presses the brake friction member toward the frictional sliding surface of the brake rotation body through use of the hydraulic pressing force which is applied to the piston as a result of the brake hydraulic pressure within the cylinder being increased by the brake hydraulic pressure supply means. When the brake rotation body stops its rotation together with the wheel, the piston presses the brake friction member toward the frictional sliding surface of the brake rotation body through use of the pressing force applied by the electric drive means. The reversing means of the retraction means reverses the hydraulic pressing force applied by the brake hydraulic pressure supply means or the pressing force applied by the electric drive means so as to provide the reverse force which acts in the retraction direction of the piston. When the brake hydraulic pressure within the cylinder is decreased by the brake hydraulic pressure supply means or when free rotation of the electric motor is permitted by the free rotation permission means, the retraction means retracts the piston having advanced to press the brake friction member, through use of the reverse force provided by the reversing means. In this case, preferably, the brake hydraulic pressure supply means decreases the brake hydraulic pressure within the cylinder after increasing the brake hydraulic pressure, when free rotation of the electric motor is permitted by the free rotation permission means.

By virtue of these configurations, for example, when parking brake operation is cancelled, free rotation (no-load rotation) of the electric motor is permitted by the free rotation permission means. Also, the brake hydraulic pressure within the cylinder can be decreased after being increased by the brake hydraulic pressure supply means. With this operation, the revering means can reverse the hydraulic pressing force generated as a result of an increase in the brake hydraulic pressure so as to provide a reverse force, and the restoring force application means can elastically deform without fail. Thus, the retraction means can retract the piston (the force transmission portion and the pressing portion) by a predetermined amount (retraction amount) through use of the restoring force which is generated by the restoring force application means as a result of a decrease in the brake hydraulic pressure.

Accordingly, in the electronic parking brake apparatus as well, the brake friction member can be separated from the frictional sliding surface of the brake rotation body by an amount corresponding to a proper clearance. Therefore, occurrence of a dragging phenomenon can be restrained reliably. Also, since the electric motor is not required to be separately controlled in the reverse direction in order to retract the advanced piston (the force transmission portion and the pressing portion) upon cancellation of the parking brake control, the drive control of the electric motor can be simplified. Also, since the advanced piston (the force transmission portion and the pressing portion) can be retracted by the reverse force and the restoring force mechanically generated by the retraction means, it is unnecessary to supply electric power to the electric motor, whereby energy saving can be achieved.

Still another feature of the present invention resides in that load detection means is provided so as to detect a load corresponding to a distortion generated due to the pressing force applied from the electric drive means to the piston. In this case, preferably, the electric drive means includes pressing force transmission means for transmitting the pressing force generated by the electric motor to the piston, and the load detection means is provided on the pressing force transmission means. In this case, preferably, the load detection means detects the load corresponding to the distortion generated in the pressing force transmission means when the pressing force transmission means transmits the pressing force to the piston.

Also, in this case, preferably, the load detection means is a pressure sensitive rubber which deforms due to the pressing force transmitted from the electric drive means to the piston and whose resistance changes in accordance with the distortion generated due to the deformation, and a load corresponding to the resistance which changes due to the deformation is detected.

By virtue of these configurations, there can be provided load detection means for detecting the load corresponding to the distortion generated due to the pressing force applied from the electric drive means to the piston. In this case, specifically, the load detection means can be provided on the pressing force transmission means which constitutes the electric drive means. Therefore, the load detection means can detect the load corresponding to the distortion generated in the pressing force transmission means as a result of transmission of the pressing force. Also, the load detection means can be formed of a pressure sensitive rubber whose resistance changes in accordance with the distortion generated due to deformation thereof, and the load corresponding to the resistance which changes in accordance with the deformation caused by the transmitted pressing force can be detected. By virtue of these, the load (i.e., the pressing force) can be accurately detected by a considerably simplified structure and arrangement. Therefore, for example, when a pressing force is applied to the piston by driving the electric motor of the electric drive means, a proper pressing force corresponding to a brake operation by a driver can be applied, whereby the driver can sense a good brake feeling.

BEST MODE FOR CARRYING OUT THE INVENTION a. First Embodiment

Figure 1:
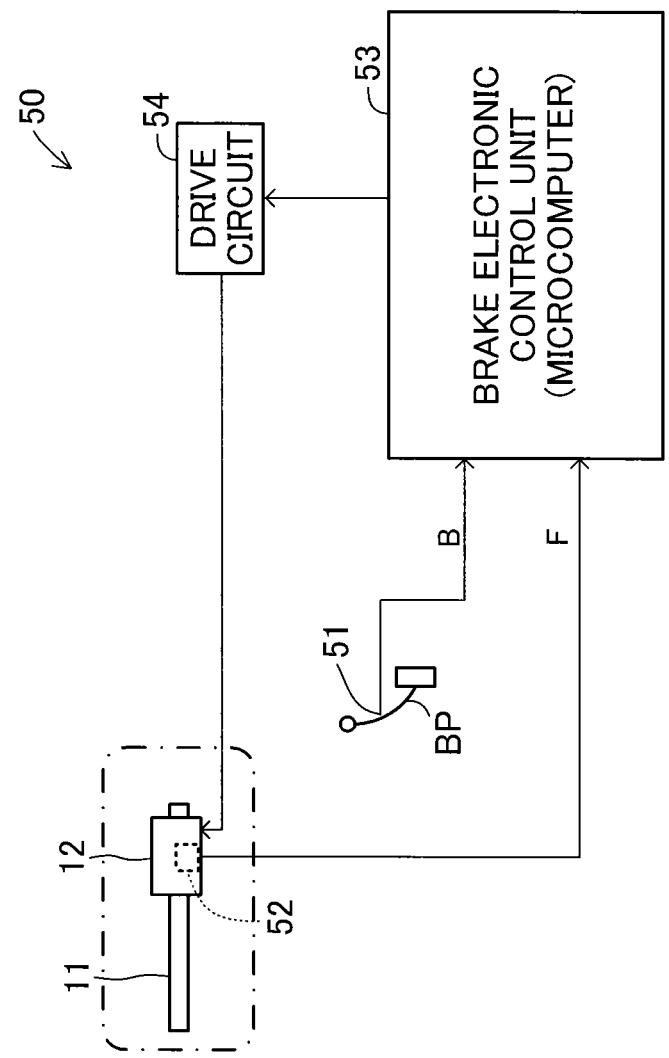
FIG. 1 is a schematic diagram of an electric brake apparatus for a vehicle according to a first embodiment of the present invention.

An embodiment of the present invention will now be described in detail with reference to the drawings. FIG. 1 schematically shows an electric brake apparatus according to a first embodiment of the present invention.

This electric brake apparatus includes a disc rotor 11 (a brake rotation body) which rotates unitarily with a wheel about the rotation axis of an axle, and an electric caliper 12 supported by an unillustrated mounting bracket fixed to a vehicle body such that the electric caliper 12 is movable along the direction of the rotation axis of the disc rotor 11. Notably, although FIG. 1 schematically shows only one wheel of a vehicle, the electric brake apparatus may be provided for each of left and right front wheels of the vehicle, each of left and right rear wheels of the vehicle, or each of all the wheels of the vehicle.

Figure 2:
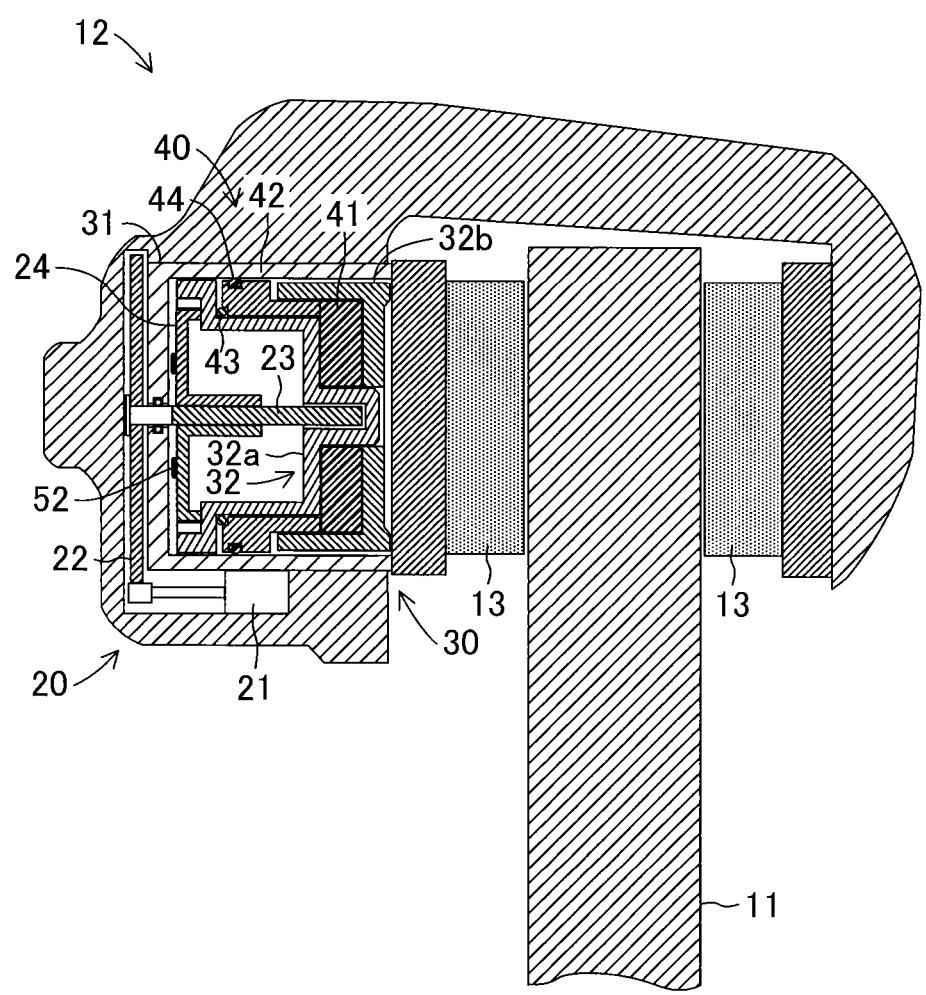
FIG. 2 is a sectional view schematically showing the structure of an electric caliper of FIG. 1.

The electric caliper 12 is electrically controlled in response to a driver's brake operation so as to bring friction pads 13 (brake friction members) into frictional engagement with corresponding frictional sliding surfaces of the disc rotor 11. For such an operation, as shown in FIG. 2, the electric caliper 12 includes an electric drive mechanism 20 (electric drive means) which is electrically controlled so as to generate pressing force; a pressing mechanism 30 which presses the friction pads 13 against the frictional sliding surfaces of the disc rotor 11 by making use of the pressing force generated by the electric drive mechanism 20; and a retraction mechanism 40 (retraction means) provided on the pressing mechanism 30.

Figure 3:
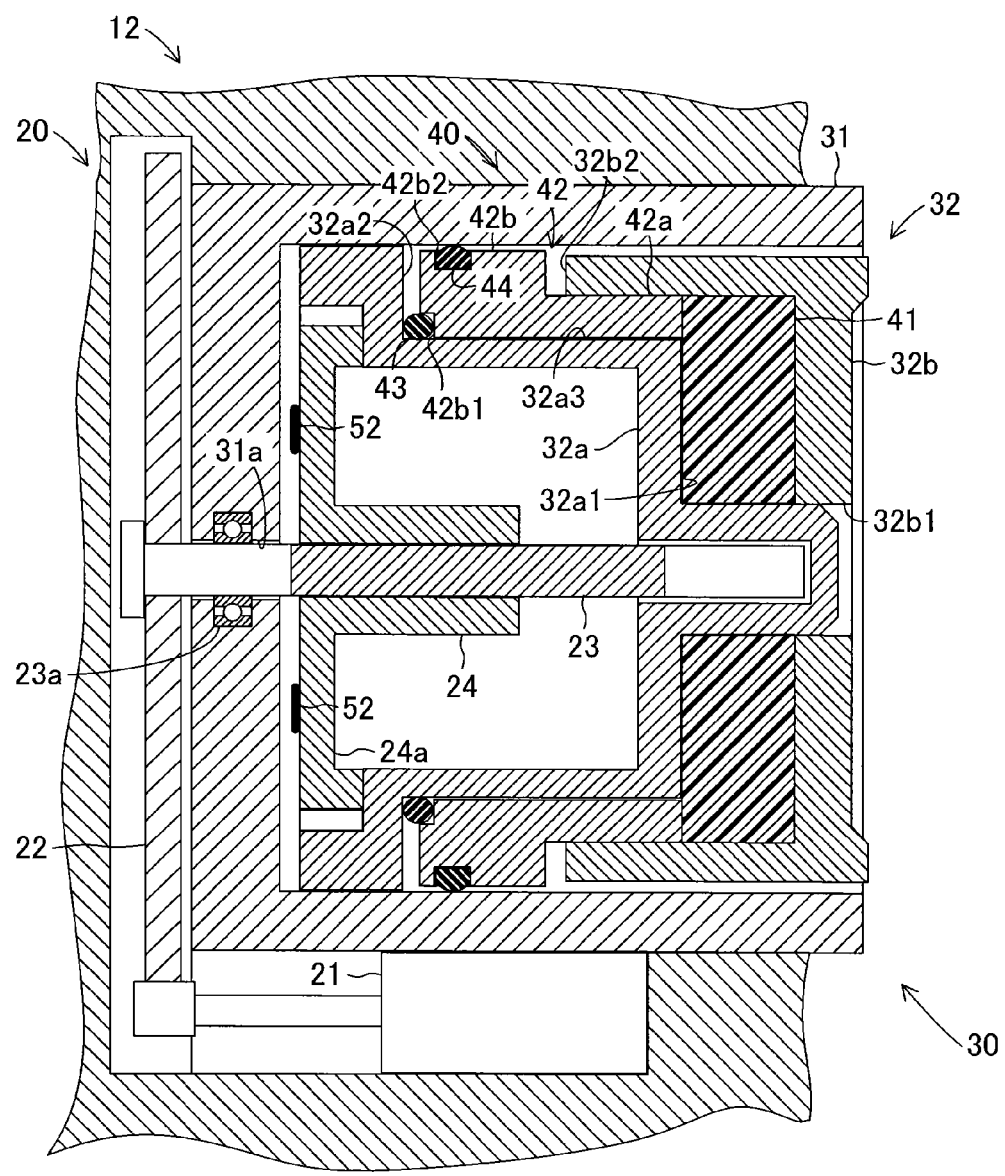
FIG. 3 is a schematic view showing, on an enlarged scale, an electric drive mechanism, a pressing mechanism, and a retraction mechanism of FIG. 2 so as to explain them.

As specifically shown in FIG. 3 on an enlarged scale, the electric drive mechanism 20 includes a brake motor 21 (an electric motor), which is, for example, a three-phase DC brushless motor. The brake motor 21 is fixedly disposed within the electric caliper 12, and is rotatively driven and controlled by an electric control apparatus 50 to be described later in order to generate a predetermined drive force; i.e., pressing force. The rotation of the brake motor 21 is transmitted to, for example, a speed change gear 22 which is in meshing engagement with a pinion fixed to the drive shaft of the brake motor 21. The speed change gear 22 reduces the speed of rotation transmitted from the brake motor 21, and rotates a ball screw 23 whose proximal end portion is unitarily assembled to the speed change gear 22. The ball screw 23 penetrates a cylinder 31 of the pressing mechanism 30 to be described later, with a bearing 23a disposed between the ball screw 23 and the cylinder 31. A ball nut 24 is in screw engagement with a distal end portion of the ball screw 23 (i.e., within the cylinder 31). The ball nut 24, which serves as pressing force transmission means, has a large diameter portion 24a. The outer circumferential surface of this large diameter portion 24a is in spline-engagement with the inner circumferential surface of a piston 32 (more specifically, a force transmission portion 32a) of the pressing mechanism 30 to be described later.

In the electric drive mechanism 20 configured as described above, when the brake motor 21 is rotatively driven and controlled, the rotation of the brake motor 21 is transmitted to the ball screw 23, while the speed of the rotation is reduced by the reduction gear 22. The rotation of the ball screw 23 is converted to an axial motion by the ball nut 24, which is spline-engaged with the piston 32 (more specifically, the force transmission portion 32a). This conversion enables the ball nut 24 to advance and retract in the axial direction of the ball screw 23. In particular, by advancing toward the friction pad 13, the ball nut 24 can transmit the pressing force generated by the brake motor 21 to the piston 32 of the pressing mechanism 30.

As specifically shown in FIG. 3, the pressing mechanism 30 includes the cylinder 31 which has the shape of a cylindrical tube with a bottom and which is non-rotatably assembled to the electric caliper 12. An insertion hole 31a, through which the ball screw 23 constituting the electric drive mechanism 20 extends, is formed in the bottom wall of the cylinder 31. The cylinder 31 supports the piston 32 such that the piston 32 can advance and retract.

The piston 32 is composed of the force transmission portion 32a which butts against the ball nut 24 accommodated within the cylinder 31 for advancing and retracting movements and transmits the pressing force, and a pressing portion 32b which presses the friction pad 13. The force transmission portion 32a receives via the ball nut 24 the pressing force generated by the brake motor 21, and transmits it to the pressing portion 32b. As shown in FIG. 3, the cylindrical force transmission portion 32a is formed into the shape of a cylinder which has a first step portion 32a1 having a small diameter, a second step portion 32a2 having a large diameter, and a connection portion 32a3 which connects the first step portion 32a1 and the second step portion a2. Although not illustrated specifically, the force transmission portion 32a is spline-engaged with the inner circumferential surface of the cylinder 31.

The pressing portion 32b is formed into the shape of a cylinder having a squarish-C-shaped cross section. A through-hole 32b1 is formed in a pressing surface of the pressing portion 32b at an approximately central portion thereof so as to slidably accommodate a circular columnar distal end portion of the force transmission portion 32a such that a frictional force acts on the distal end portion. The retraction mechanism 40 is provided on the piston 32 formed by the force transmission portion 32a and the pressing portion 32b as described above.

As specifically shown in FIG. 3, the retraction mechanism 40 includes a disc-like reversing member 41 (reversing means) which is disposed between the inner circumferential surface of the pressing portion 32b and the first step portion 32a1 formed on the force transmission portion 32a of the piston 32 and whose diameter is greater than the outer diameter of the connection portion 32a3 and is smaller than the inner diameter of the pressing portion 32b. The reversing member 41 is formed of a viscoelastic material (e.g., a rubber material having a low hardness), and has a predetermined thickness. The retraction mechanism 40 has a movable element 42 (reverse force transmission means) which is assembled onto the outer circumferential surface of the connection portion 32a3 of the force transmission portion 32a of the piston 32 such that the movable element 42 can advance and retract. The movable element 42 is formed into the shape of a cylindrical tube (sleeve) which has a thin wall portion 42a accommodated between the outer circumferential surface of the connection portion 32a3 and the inner circumferential surface of the pressing portion 32b, and a thick wall portion 42b which is movable between the second step portion 32a2 of the force transmission portion 32a and an end surface 32b2 of the pressing portion 32b.

A distal end surface of the thin wall portion 42a butts against the reversing member 41. The thickness of the thin wall portion 42a is set smaller than the length of the first step portion 32a1 of the force transmission portion 32a of the piston 32 as measured in the radial direction. Namely, the area of contact between the distal end surface of the thin wall portion 42a and the reversing member 41 is set smaller than the area of contact between the first step portion 32a1 and the reversing member 41.

The thick wall portion 42b has an annular accommodation step portion 42b1 formed on its inner circumferential surface, and a first elastic member 43, serving as restoring force application means, is accommodated in the accommodation step portion 42b1. The thick wall portion 42b also has an annular accommodation groove 42b2 formed on its outer circumferential surface, and a second elastic member 44, serving as deformation maintaining means, is accommodated in the accommodation groove 42b2.

The first elastic member 43 is formed of a material having a high elasticity (e.g., rubber material or the like) and has a ring-like shape. When the first elastic member 43 is elastically deformed between the inner circumferential surface of the accommodation step portion 42b1 of the movable element 42 and the second step portion 32a2 of the force transmission portion 32a, the first elastic member 43 generates an elastic forcer (restoring force) corresponding to this elastic deformation. Notably, an O-ring having an approximately O-shaped cross section or an unillustrated D-ring having an approximately D-shaped cross section may be used as the first elastic member 43.

The second elastic member 44 is formed of an elastic material having a high friction coefficient (e.g., rubber material or the like) and has a ring-like shape. The second elastic member 44 is accommodated in the accommodation groove 42b2 of the movable element 42 so as to apply a predetermined pressing force (i.e., stress) to the inner circumferential surface of the cylinder 31. The second elastic member 44 generates a friction force of a predetermined magnitude against displacement of the movable element 42. Notably, a D-ring having an approximately D-shaped cross section or an unillustrated O-ring having an approximately O-shaped cross section may be used as the second elastic member 44.

Figure 4:
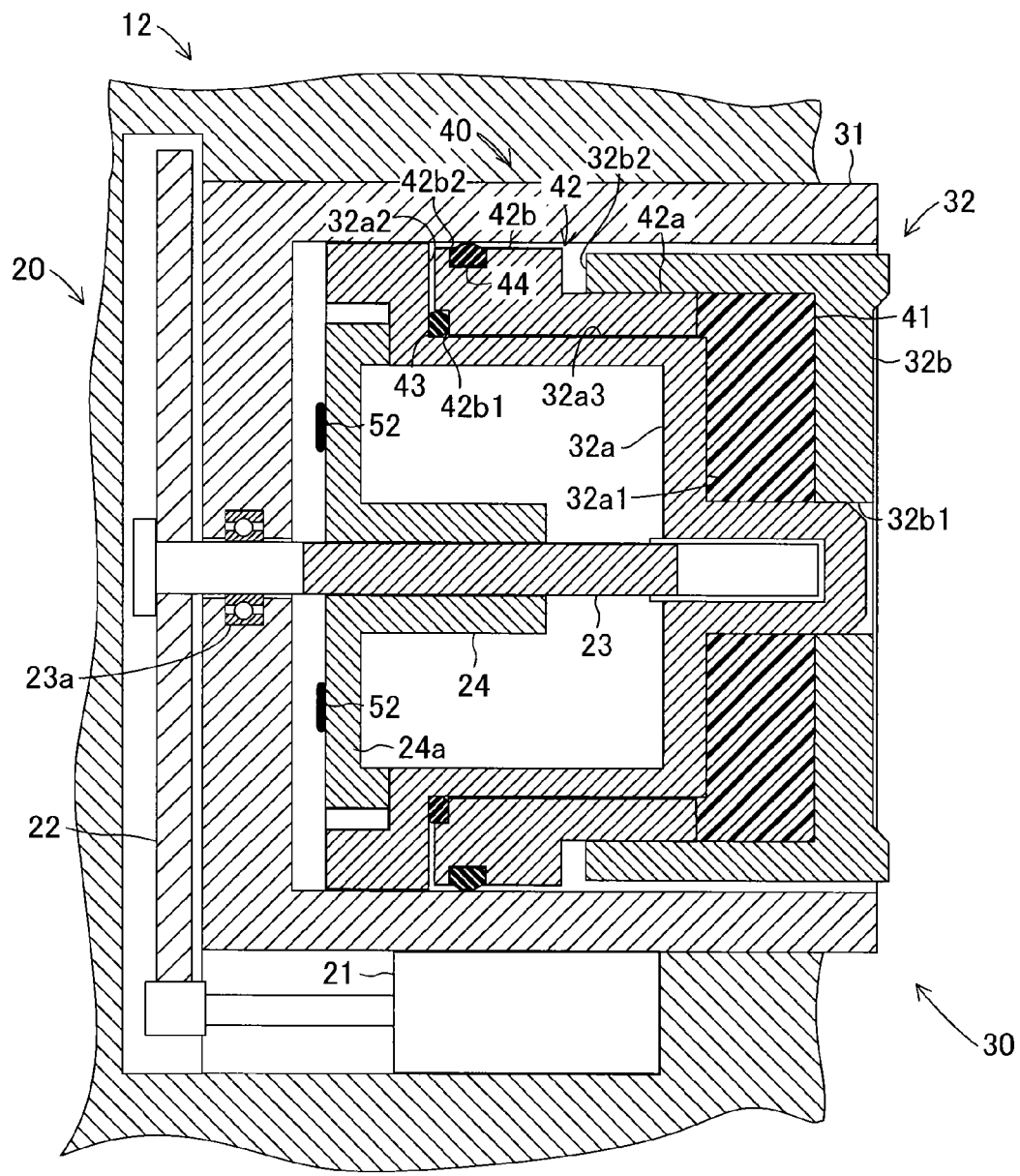
FIG. 4 is a view for explaining that a retraction mechanism returns a piston when the amount of advance movement of the piston is small.

Next, the basic operation of the retraction mechanism 40 configured as described above will be described. When the electric control apparatus 50 drives and controls the brake motor 21 so as to cause the ball nut 24 to apply a pressing force to the force transmission portion 32a as will be described later, as shown in FIG. 4, the force transmission portion 32a of the piston 32 advances toward the pressing portion 32b.

As shown in FIGS. 2 and 3, the reversing member 41 is accommodated within a space which is formed by the outer circumferential surface of the distal end portion of the force transmission portion 32a, the inner circumferential surface of the pressing portion 32b, the outer surface of the first step portion 32a1, and the distal end surface of the thin wall portion 42a of the movable element 42 (hereinafter, the space will be referred to as an "accommodation space"). Therefore, when the reversing member 41 is compressed within the accommodation space by the outer surface of the first step portion 32a1, as shown in FIG. 4, due to its viscoelastic characteristic, the reversing member 41 applies to the distal end surface of the thin wall portion 42a of the movable element 42 a reverse force for relatively moving the movable element 42 in a retraction direction opposite the advancement direction of the force transmission portion 32a (i.e., the piston 32).

More specifically, the reversing member 41 is accommodated in the accommodation space which is surrounded by the outer circumferential surface of the distal end portion of the force transmission portion 32a, which is not deformable, and the inner circumferential surface of the pressing portion 32b, and which is also surrounded by the outer surface of the first step portion 32a1 of the force transmission portion 32a, which is movable in the reciprocation direction of the piston 32, and the distal end surface of the thin wall portion 42a of the movable element 42. Therefore, as shown in FIG. 4, the reversing member 41 formed of a viscoelastic material deforms, while pushing back the distal end surface of the thin wall portion 42a of the movable element 42, so that a portion of the reversing member 41 moves from the accommodation space, the volume of the portion corresponding to a decrease in the volume of the accommodation space caused by the intrusion of the first step portion 32a1 of the force transmission portion 32a into the accommodation space. That is, the reversing member 41 exhibits a reverse force generation function of reversing the advancing force for advancing the force transmission portion 32a (in other words, the pressing force generated by the electric drive mechanism 20) so as to generate a reverse force to be applied to the movable element 42.

The contact area through which the distal end surface of the thin wall portion 42a comes into contact with the reversing member 41 is set smaller than the contact area through which the first step portion 32a1 of the force transmission portion 32a comes into contact with the reversing member 41. Therefore, when the first step portion 32a1 intrudes into the accommodation space, the reversing member 41 displaces (moves) the movable element 42 in a direction opposite the advancement direction of the force transmission portion 32a (the piston 32); i.e., in the retraction direction of the force transmission portion 32a (the piston 32), by a push-back amount (retraction stroke) greater than the intrusion amount (advancement stroke) of the first step portion 32a1.

Also, in the retraction mechanism 40, the first elastic member 43 is disposed between the accommodation step portion 42b1 formed on the thick wall portion 42b of the movable element 42 and the second step portion 32a2 of the force transmission portion 32a. Therefore, when the movable element 42, to which the reverse force has been applied from the reversing member 41, retracts relatively as a result of advancement of the force transmission portion 32a as shown in FIG. 4, the first elastic member 43 is compressed between the movable element 42 and the second step portion 32a2, and elastically deforms. Namely, the movable element 42 exhibits a reverse force transmission function of transmitting the reverse force from the reversing member 41 to the first elastic member 43.

Thus, the first elastic member 43 can apply to the movable element 42 and the second step portion 32a2 an elastic force (restoring force) corresponding to the amount of relative displacement between the movable element 42 and the force transmission portion 32a; in other words, the amount of compression. Accordingly, the first elastic member 43 exhibits a restoring force application function. The amount of relative displacement of the movable element 42 in relation to the force transmission portion 32a is restricted by the maximum amount of elastic deformation of the first elastic member 43 (or by butting between the end of the accommodation step 42b1 and the second step portion 32a2). Namely, the amount of relative displacement of the movable element 42 in relation to the force transmission portion 32a, which is restricted by the maximum elastic deformation amount of the first elastic member 43, corresponds to the return amount (retraction amount) by which the force transmission portion 32a (the piston 32) is returned.

Furthermore, in the retraction mechanism 40, the second elastic member 44 is accommodated in the accommodation groove 42b2 formed on the thick wall portion 42b of the movable element 42, and generates a predetermined friction force between the second elastic member 44 and the inner circumferential surface of the cylinder 31. Therefore, when the reverse force applied from the reversing member 41 to the movable element 42 decreases as a result of a decrease in the pressing force generated by the brake motor 21, the friction force generated by the second elastic member 44 restricts the relative displacement of the movable element 42 in relation to the inner circumferential surface of the cylinder 31, whereby the elastic deformation of the first elastic member 43 is maintained. Namely, the second elastic member 44 exhibits a friction force generation function (deformation maintaining function). Accordingly, in a situation where the first elastic member 43 is compressed and can apply the restoring force, the large friction force generated by the second elastic member 44 restrains displacement of the movable element 42. Therefore, the restoring force generated by the first elastic member 43 is transmitted to the force transmission portion 32a through the second step portion 32a2, and serves a return force for retracting the piston 32 in a direction away from the friction pad 13. In addition, preferably, the predetermined friction force between the second elastic member 44 and the inner circumferential surface of the cylinder 32 is set such that the force transmission portion 32a (piston 32) becomes able to retract in relation to the cylinder 31 through use of the applied restoring force by the first elastic member 43 and the movable element 42 becomes able to move in relation to the cylinder 31 upon a brake operation.

Figure 5:
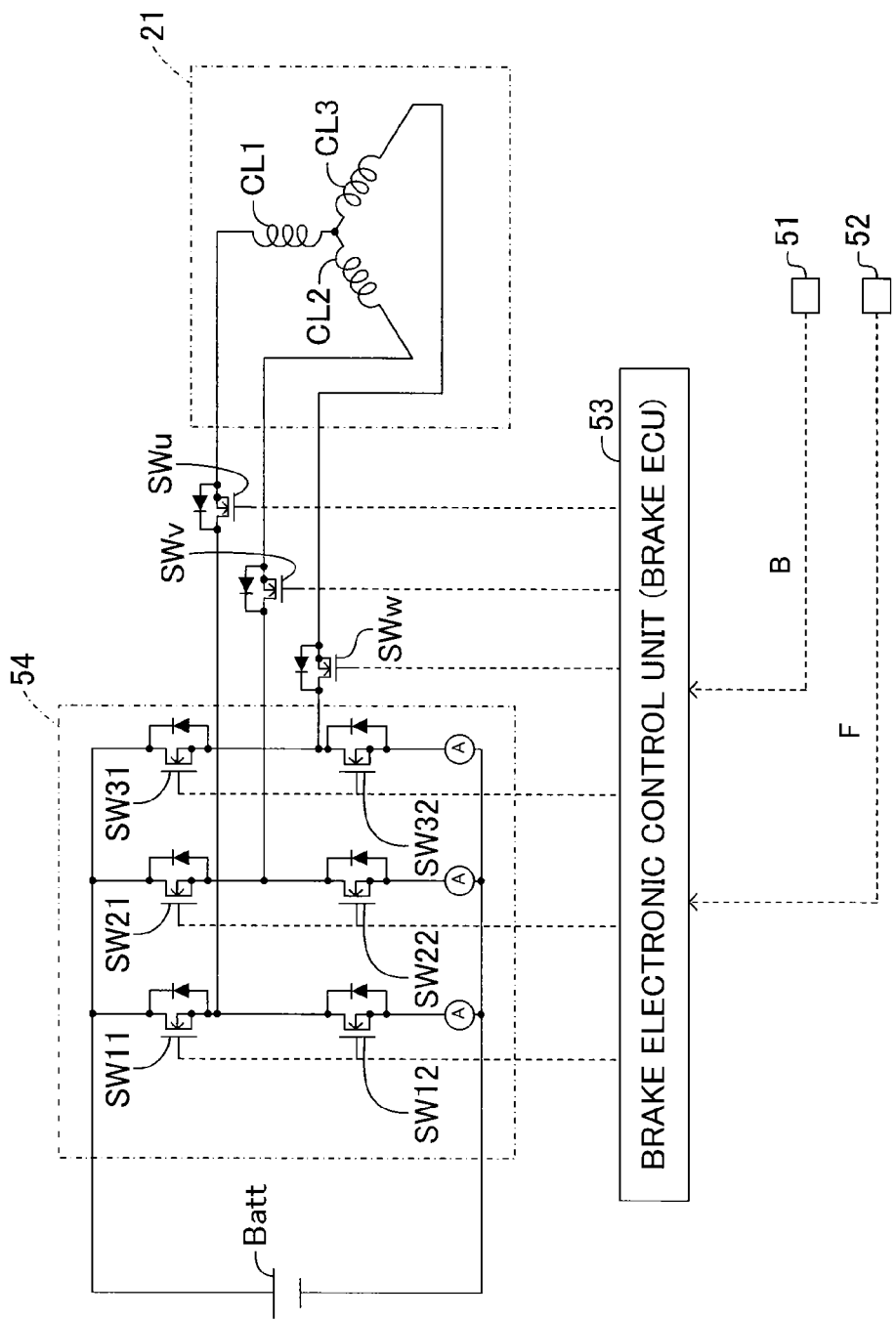
FIG. 5 is a schematic diagram showing the configuration of an electric control apparatus of FIG. 1.

As shown in FIGS. 1 and 5, the electric control apparatus 50 includes a brake depressing force sensor 51 and a load sensor 52. The brake depressing force sensor 51 detects a depressing force (operation force) applied to a brake pedal BP as a result of operation by the driver, and outputs a signal representing the detected depressing force B. As shown in FIGS. 2 and 4, the load sensor 52, which serves as load detection means, is assembled to the ball nut 24. The load sensor 52 detects a distortion which is generated in the large diameter portion 24a of the ball nut 24 as a result of transmission of the pressing force generated by the brake motor 21 to the second step portion 32a2 of the piston 32, and outputs a signal representing a load F (i.e., pressing force) determined on the basis of the detected distortion.

The brake depressing force sensor 51 and the load sensor 52 are connected to a brake electronic control unit 53 (hereinafter simply referred to as the "brake ECU 53"). The brake ECU 53 includes, as a main component, a microcomputer composed of a CPU, ROM, RAM, etc., and controls the drive of the brake motor 21 of the electric drive mechanism 20 by executing various programs. Therefore, as specifically shown in FIG. 5, a motor drive circuit 54 for driving and controlling the brake motor 21 is connected to the output side of the brake ECU 53.

As shown in FIG. 5, the motor drive circuit 54, which constitutes a three-phase inverter circuit, includes switching elements SW11, SW12, SW21, SW22, SW31, and SW32 corresponding to magnetic coils CL1, CL2, and CL3 of the brake motor 21, which are star-connected (Y-connected). The switching elements SW11 and SW12, the switching elements SW21 and SW22, and the switching elements SW31 and SW32 correspond to U-phase, V-phase, and W-phase, which are the three phases of the brake motor 21. The switching elements SW11, SW21, and SW31 correspond to the High side (high potential side), and the switching elements SW12, SW22, and SW32 correspond to the Low side (low potential side). These switching elements are constituted by, for example, MOSFETs. Notably, a current sensor for detecting the currents flowing through the coils of the brake motor 21 is provided in the motor drive circuit 54. Also, switching elements SWu, SWv, and SWw (e.g., MOSFETs), which serve as free rotation permission means for cutting off the current (electric power) supplied to the phase coils of the brake motor 21, are provided in the power lines which connects the motor drive circuit 54 and the phase coils of the brake motor 21.

As shown in FIG. 5, the switching elements SW11, SW12, SW21, SW22, SW31, and SW32 and the switching elements SWu, SWv, and SWw are turned on and off by signals from the brake ECU 53. Accordingly, in the motor drive circuit 54, the brake ECU 53 controls the pulse widths of the switching elements SW11, SW12, SW21, SW22, SW31, and SW32 (PWM control) through drive control preformed thereby, whereby the amount of current supplied from a battery Batt to the brake motor 21 can be controlled. Also, the brake ECU 53 cuts off the supply of current (electric power) from the battery Batt to the brake motor 21 by turning off (i.e., opening) the switching elements SWu, SWv, and SWw, whereby the brake motor 21 can be brought into a free rotation state (no load state).

Figure 6:
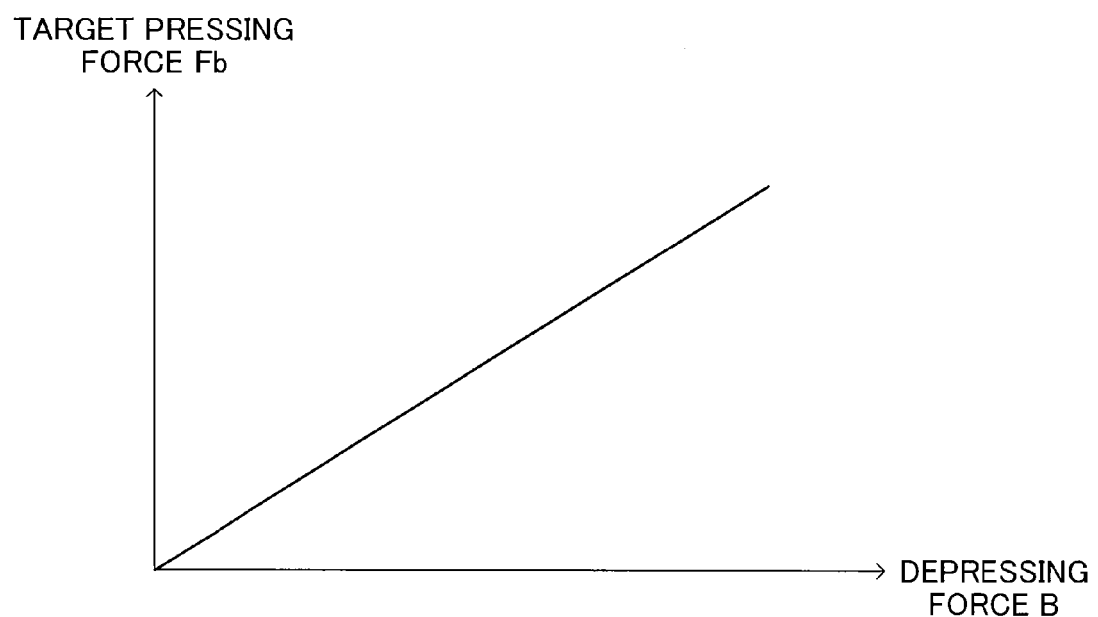
FIG. 6 is a graph showing the relation between depressing force and target pressing force.

Next, the operation of the electric brake apparatus according to the first embodiment configured as described above will be described. In the disc brake apparatus including the electric caliper 12, when a driver operates the brake pedal BP, the depressing force sensor 51 detects the depressing force B corresponding to the brake operation, and outputs the depressing force B to the brake ECU 53. The brake ECU 53 determines, with reference to, for example, a target pressing force determination map shown in FIG. 6, a target pressing force Fb (corresponding to actual braking force) which corresponds to the depressing force B received from the depressing force sensor 51 and with which the pressing mechanism 30 presses the friction pad 13 against the disc rotor 11. Notably, the target pressing force Fb determined with reference to the target pressing force determination map increases with the detected depressing force B. Therefore, the brake ECU 53 may store a function of the detected depressing force B set advance. In such a case, instead of referring to the map, the brake ECU 53 determines the target pressing force Fb by making use of the function.

Upon determination of the target pressing force Fb as described above, the brake ECU 53 drives and controls the brake motor 21 so as to cause the brake motor 21 to generate the determined target pressing force Fb. Specifically, the brake ECU 53 receives the detected load F from the load sensor 52, and drives and controls the brake motor 21 via the brake drive circuit 54 on the basis of the difference between the target pressing force Fb and the detected load F. The brake motor 21 is controlled in accordance with, for example, a known vector control method. In the vector control method, currents, voltages, etc., of three phases of the brake motor 21 are handled by converting them to values of two phases; i.e., a component in a d-axis direction parallel to the direction of a magnetic field generated by a permanent magnet provided on the rotor of the motor 21, and a component in a q-axis direction orthogonal to the direction of the magnetic field. Since the vector control method does not directly relate to the present invention, its description is omitted.

Subsequently, the brake ECU 53 determines target duty ratios of the switching elements SW11, SW12, SW21, SW22, SW31, and SW32 on the basis of target voltages determined for the respective phases of the brake motor 21 in accordance with the known vector control method, and switches or controls the ON/OFF states of the switching elements SW11, SW12, SW21, SW22, SW31, and SW32 in accordance with a known PWM scheme and on the basis of the determined duty ratios. Thus, the target voltages of the three phases are converted to AC voltages of the three phases, whereby the brake motor 21 generates the target pressing force Fb. Notably, in this case, the brake ECU 53 turns on (closes) the switching elements SWu, SWv, and SWw to thereby permit the supply of current (electric power) from the battery Batt to the brake motor 21.

When the brake motor 21 generates the target pressing force Fb as described above, the rotation from the brake motor 21 is transmitted to the ball screw 23 while the rotation speed is changed (e.g., decreased) by the speed change gear 22. When the ball screw 23 rotates, the ball nut 24 in screw engagement with the ball screw 23 advances toward the friction pad 13 along the axial direction of the ball screw 23. At that time, the ball nut 24 advances the force transmission portion 32a of the piston 32 toward the pressing portion 32b.

As a result, the target pressing force Fb generated by the brake motor 21 is transmitted to the force transmission portion 32a via the ball nut 24, and the force transmission portion 32a transmits the target pressing force Fb to the pressing portion 32b via the reversing member 41 of the retraction mechanism 40. Accordingly, the pressing portion 32b presses the friction pad 13 with the target pressing force Fb, and brings the friction pad 13 into pressure contact with the frictional sliding surface of the disc rotor. Thus, a braking force corresponding to the depressing force B applied to the brake pedal BP by the driver can be applied to a rotating wheel. Notably, in the case where the electric caliper 12 employs a general floating system, a reaction force is produced when one of the two paired friction pads 13 is pressed against one frictional sliding surface of the disc rotor 11 as a result of advancement of the piston 32, and the reaction force causes the other friction pad 13 to move in the direction opposite the moving direction of the piston 32 and come into pressure contact with the other frictional sliding surface of the disc rotor 11.

Meanwhile, when the driver cancels the operation of the brake pedal BP; i.e., when the depressing force B detected by the depressing force sensor 51 becomes substantially "0," the brake ECU 53 turns off (opens) the switching elements SWu, SWv, and SWw so as to cut off the supply of current (electric power) from the battery Batt to the brake motor 21, to thereby permit free rotation (no-load rotation) of the brake motor 21. Subsequently, the retraction mechanism 40 retracts the force transmission portion 32a and the pressing portion 32b (i.e., the piston 32) in the direction away from the disc rotor 11, to thereby separate the friction pad 13 from the frictional sliding surface of the disc rotor 11 by an amount corresponding to a proper clearance.

The operation of returning the piston 32 by the retraction mechanism 40 will be described specifically. As described above, in the situation where the brake pedal BP is operated by the driver, the brake ECU 53 drives and controls the brake motor 21 so that the piston 32 presses the friction pad 13 against the frictional sliding surface of the disc rotor 11 with the target pressing force Fb. In such a situation, as shown in FIG. 4, since the first step portion 32a1 intrudes into the above-mentioned accommodation space as a result of advancement of the force transmission portion 32a, the reversing member 41 generates a reverse force as a result of compression thereof, and applies the generated reverse force to the movable element 42. Therefore, by the reverse force applied from the reversing member 41 and the friction force generated by the second elastic member 44, the movable element 42 is caused to retract in relation to the advancing force transmission portion 32a (the advanced piston 32) (more specifically, without moving in relation to the inner circumferential surface of the cylinder 31). As a result, the first elastic member 43 is compressed by the second step portion 32a2 of the force transmission portion 32a.

When the driver cancels the operation of the brake pedal BP in such a state, the brake ECU 53 turns off (opens) the switching elements SWu, SWv, and SWw to thereby stop the supply of current (electric power) from the battery Batt to the brake motor 21. Thus, free rotation (no-load rotation) of the brake motor 21 is permitted. As a result, the pressing force transferred to the force transmission portion 32a via the ball nut 24 decreases quickly. Incidentally, the friction force generated by the second elastic member 44 restrains displacement of the movable element 42 in relation to the inner circumferential surface of the cylinder 31. Therefore, the restoring force of the first elastic member 43 is applied to the force transmission portion 32a via the second step portion 32a2. As a result, the force transmission portion 32a retracts in the direction away from the friction pad 13 together with the ball nut 24.

At that time, since free rotation (no-load rotation) of the brake motor 21 is permitted, the ball nut 24 can retract quite easily while rotating the ball screw 23. Accordingly, the force transmission portion 32a, which butts against the ball screw 23, can also retract quite easily.

Also, since the pressing portion 32b is frictionally and slidably coupled with the distal end portion of the force transmission portion 32a via the through-hole 32b1, the pressing portion 32b retracts together with the force transmission portion 32a due to the friction force therebetween. Thus, the force transmission portion 32a and the pressing portion 32b (i.e., the piston 32) retracts by a retraction amount corresponding to the amount of elastic deformation of the first elastic member 43.

Notably, in the case where the electric caliper 12 employs a general floating system, one of the two paired friction pads 13 separates from one frictional sliding surface of the disc rotor 11 as a result of retraction of the piston 32, and the reaction force generated as a result of the retraction of the piston 32 causes the other friction pad 13 to move in the direction opposite the moving direction of the piston 32 and separate from the other frictional sliding surface of the disc rotor 11.

In the case where the pressing force generated by the brake motor 21 in response to the operation of the brake pedal BP by the driver is excessively large or in the case where the wear of the friction pad 13 is large, the retraction mechanism 40 advances to follow the piston 32 and can reliably retract the piston 32 upon cancellation of the brake operation. Specifically, when the pressing force generated by the brake motor 21 is excessively large, due to deformation of the friction pad 13 or the like, the amount of advancement of the force transmission portion 32a and the pressing portion 32b may increase and become equal to or greater than a predetermined amount. In such a case, the movable element 42 becomes unable to retract in relation to the force transmission portion 32a in a situation where the amount of elastic deformation of the first elastic member 43 has reached the maximum elastic deformation amount or a situation where the end of the accommodation step portion 42b1 of the movable element 42 butts against the second step portion 32a2 of the force transmission portion 32a.

Figure 7:
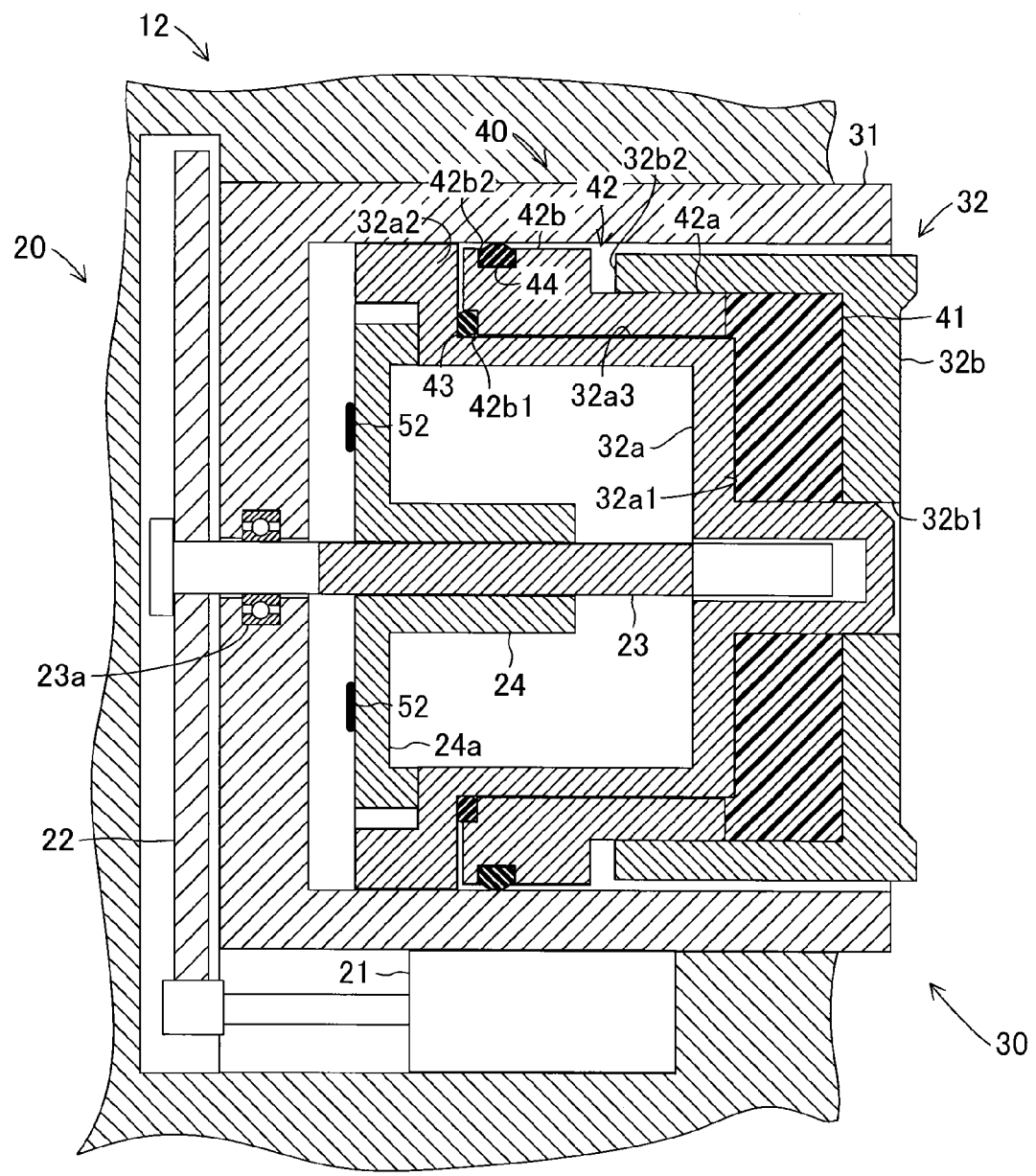
FIG. 7 is a view for explaining that the retraction mechanism returns the piston when the amount of advance movement of the piston in relation to a cylinder is large.

Accordingly, in such a case, as shown in FIG. 7, the retraction mechanism 40 advances to follow the advancement of the force transmission portion 32a and the pressing portion 32b. When the driver cancels the operation of the brake pedal BP in such a state, the brake ECU 53 permits free rotation (no-load rotation) of the brake motor 21, and the restoring force of the first elastic member 43 retracts the force transmission portion 32a and the pressing portion 32b (i.e., the piston 32) by a retraction amount corresponding to the maximum elastic deformation amount of the first elastic member 43.

Also, in the case where the wear of the friction pad 13 is large, the distance (clearance) between the friction pad 13 and the disc rotor 11 increases, and the amount of advancement of the force transmission portion 32a and the pressing portion 32b increases so as to press the friction pad 13 against the frictional sliding surface of the disc rotor 11. In such a case, the retraction mechanism 40 advances to follow the advancement of the force transmission portion 32a and the pressing portion 32b until the pressing portion 32b of the piston 32 presses the friction pad 13 and brings the friction pad 13 into pressure contact with the frictional sliding surface of the disc rotor 11.

Namely, in this case, when the force transmission portion 32a advances the pressing portion 32b toward the friction pad 13 in accordance with the pressing force generated by the brake motor 21, the pressing portion 32b does not stop until it brings the friction pad 13 into pressure contact with the frictional sliding surface of the disc rotor 11. Therefore, the force transmission portion 32a advances the pressing portion 32b toward the friction pad 13 without compressing the reversing member 41 between the first step portion 32a1 and the inner circumferential surface of the pressing portion 32b. Therefore, the reversing member 41 applies no reverse force to the movable element 42. Accordingly, for example, when the force transmission portion 32a advances with an advancing force greater than the friction force generated by the second elastic member 44, the movable element 42 advances to follow the force transmission portion 32*a* and the pressing portion 32*b*, accompanied by elastic deformation of the first elastic member 43.

When the pressing portion 32*b* presses the friction pad 13 and its pressure contact with the frictional sliding surface of the disc rotor 11 starts in such a state, as described above, the first step portion 32*a*1 intrudes into the accommodation space as the force transmission portion 32*a* advances. Therefore, the reversing member 41 generates a reverse force as it is compressed, and applies the generated reverse force to the movable element 42, which is now located at a position (a new reference position) to which the movable element 42 has moved as a result of the follow-up operation. As a result, by the reverse force applied from the reversing member 41 and the friction force generated by the second elastic member 44, the movable element 42 is caused to retract in relation to the advancing force transmission portion 32*a* (the advancing piston 32) (more specifically, without moving in relation to the inner circumferential surface of the cylinder 31). As a result, the first elastic member 43 is compressed by the second step portion 32*a*2 of the force transmission portion 32*a*.

When the driver cancels the operation of the brake pedal BP in such a state, the brake ECU 53 turns off (opens) the switching elements SWu, SWv, and SWw to thereby stop the supply of current (electric power) from the battery Batt to the brake motor 21. Thus, free rotation (no-load rotation) of the brake motor 21 is permitted. The friction force generated by the second elastic member 44 restrains displacement of the movable element 42 from the new reference position on the inner circumferential surface of the cylinder 31. Since free rotation (no-load rotation) of the brake motor 21 is permitted, the ball nut 24 can rotate the ball screw 23 quite easily, and the force transmission portion 32*a* can retract quite easily. Also, since the pressing portion 32*b* is frictionally and slidably coupled with the distal end portion of the force transmission portion 32*a* via the through-hole 32*b*1, the pressing portion 32*b* retracts together with the force transmission portion 32*a* due to the friction force therebetween.

Thus, the force transmission portion 32*a* and the pressing portion 32*b* (i.e., the piston 32) can retract by a retraction amount corresponding to the amount of elastic deformation of the first elastic member 43. Accordingly, as shown in FIG. 2, the friction pad 13 can separate from the frictional sliding surface of the disc rotor 11.

As can be understood from the above description, according to the above-described first embodiment, when free rotation (no-load rotation) of the brake motor 21 of the electric drive mechanism 20 is permitted by the brake ECU 53, the retraction mechanism 40 can properly return the advanced piston 32 of the pressing mechanism 30 by a predetermined amount (retraction amount) through use of a reverse force which is generated by the reversing member 41 by reversing the pressing force generated by the brake motor 21.

Specifically, when the driver cancels the brake operation, the brake ECU 53 permits free rotation (no-load rotation) of the brake motor 21. In the retraction mechanism 40, the first elastic member 43, which has been compressed by the movable element 42 as a result of transmission of the reverse force from the reversing member 41 thereto, applies its restoring force to the force transmission portion 32*a* of the piston 32. Thus, the force transmission portion 32*a* can be retracted by a predetermined amount (retraction amount) together with the pressing portion 32*b*.

As a result, the friction pad 13 can be separated from the frictional sliding surface of the disc rotor 11 by an amount corresponding to a proper clearance. Therefore, occurrence of undesirable contact (dragging phenomenon) between the disc rotor 11 and the friction pad 13 can be restrained reliably. Also, since the brake ECU 53 is not required to separately rotate the brake motor 21 in the reverse direction in order to retract the advanced piston 32, the drive control of the brake motor 21 can be simplified. Also, since the advanced piston 32 can be retracted by the reverse force and the restoring force mechanically generated by the retraction mechanism 40, it is unnecessary to supply electric power to the brake motor 21, whereby energy saving can be achieved.

Also, the reverse force (retraction stroke) can be applied to the movable element 42 through deformation of the reversing member 41 caused by advancement of the piston 32. The movable element 42 can reliably compress the first elastic member 43 in cooperation with the piston 32 (more specifically, the force transmission portion 32*a*). Accordingly, the first elastic member 43 can be deformed elastically and efficiently. As a result, it is possible to reliably generate the restoring force so as to retract the advanced piston 32.

Moreover, since the load sensor 52 can be provided on the ball nut 24, which constitutes the electric drive mechanism 20, the load sensor 52 can detect a load F corresponding to a distortion generated in the ball nut 24 as a result of transmission of the pressing force. Thus, the load F; i.e., the pressing force, can be detected accurately by a considerably simplified structure and a considerably simplified arrangement, and the brake ECU 53 can drive and control the brake motor 21 through use of the detected load F. Accordingly, the brake ECU 53 can properly apply a braking force to a rotating wheel, and the driver can sense a good brake feeling.

In addition, in the above-described first embodiment, the brake ECU 53 permits free rotation (no-load rotation) of the brake motor 32 and the retraction mechanism 40 retracts the advanced piston 32, when the driver cancels the brake operation. Additionally, for example, the brake ECU 53 can apply a braking force to a rotating wheel to correct a vehicle driving behavior properly, without the brake operation by the driver. In this case, the retraction mechanism 40 can retract the advanced piston 32, along with the above-described first embodiment. Namely, in this case, the brake ECU 53 can permit free rotation (no-load rotation) of the brake motor 32, along with the above-described first embodiment, when the applying of the braking force to the rotating wheel is canceled after the vehicle driving behavior is corrected. Then, the retraction mechanism 40 can retract the advanced piston 32. Therefore, in this case as well, effects similar to those attained by the above-described first embodiment are obtained.

In the above-described first embodiment, the electric brake apparatus is implemented as a brake apparatus which generates a braking force for stopping a vehicle which is traveling. However, the electric brake apparatus may be implemented such that it exhibits a function of applying a braking force to a wheel so as to stop a vehicle which is traveling, and operates as an electric parking brake apparatus which brakes rotation of the wheel even when the driver cancels the operation of the brake pedal BP after he or she parks the vehicle.

Even in the case where the electric brake apparatus of the first embodiment is operated as an electric parking brake apparatus as described above, the reversing member 41 can generate a reverse force through use of the pressing force generated by the brake motor 21 of the electric drive mechanism 20, and the movable element 42, to which the reverse force has been applied, can compress the first elastic member 43. By bringing the brake motor 21 into a free rotation state (no-load rotation state) when the first elastic member 43 generates a restoring force, the advanced piston 32 can be retracted without fail. Accordingly, even in the case where a large pressing force is applied form the electric drive mechanism 20 to the piston 32 as a result of the electric brake apparatus operating as an electric parking brake apparatus, the advanced piston 32 can be retracted without fail. Therefore, occurrence of the above-mentioned dragging phenomenon can be prevented without fail.

b. Second Embodiment

In the above-described first embodiment, when the brake pedal BP is operated by a driver, the brake ECU 53 drives and controls the brake motor 21 so as to apply a braking force to a rotating wheel. However, the electric brake apparatus of the present invention may be embodied such that when a braking force is to be applied to a rotating wheel, like a known brake apparatus, the piston is advanced through use of oil pressure (hydraulic pressure) of brake fluid so as to bring the friction pad into pressure contact with the frictional sliding surface of the disc rotor, and the electric brake apparatus operates as a so-called electric parking brake apparatus for braking rotation of a wheel when the vehicle is parked or stopped. This second embodiment will now be described. Portions identical to those of the first embodiment are denoted by the same reference numerals, and their descriptions will not be repeated.

Figure 8:
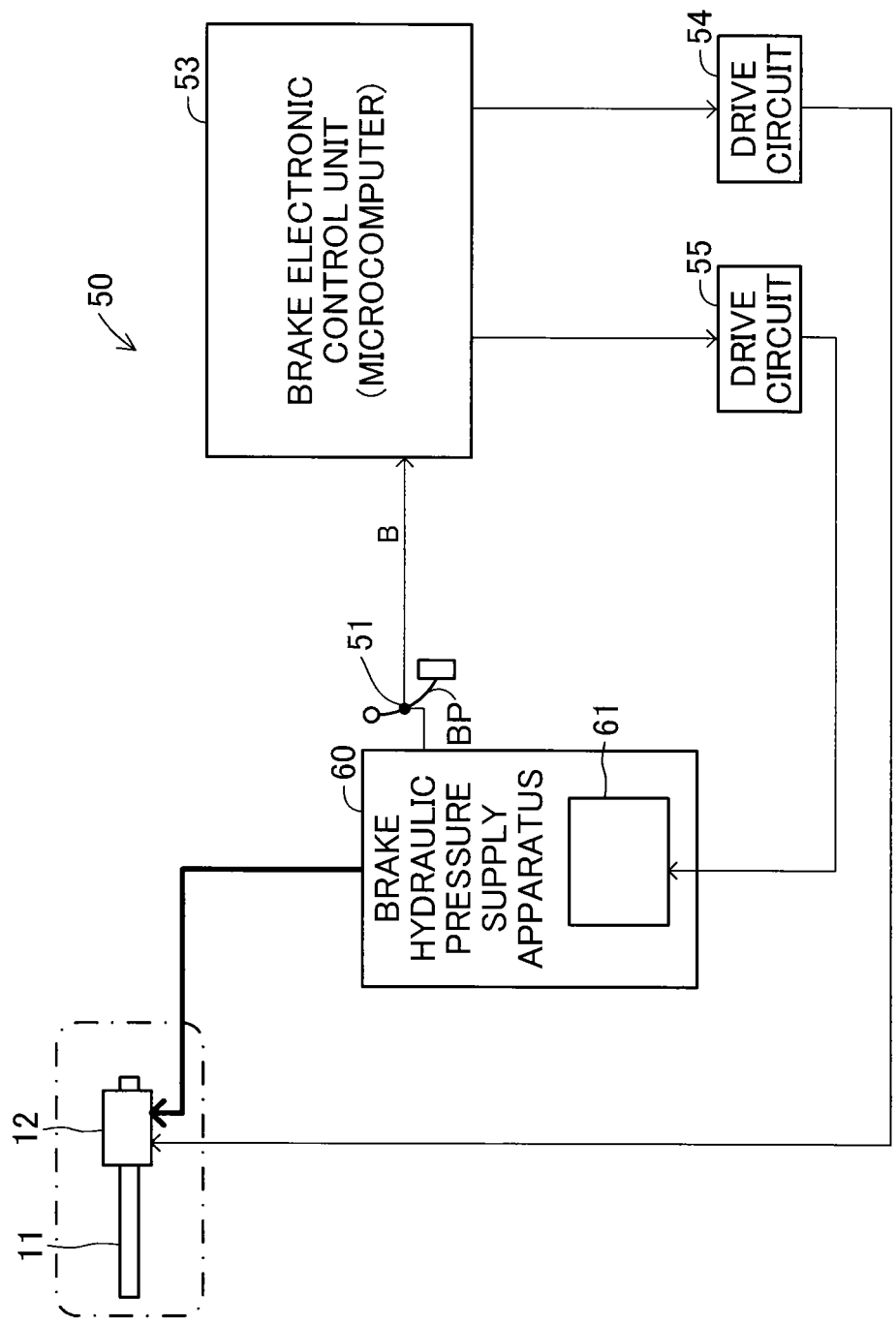
FIG. 8 is a schematic diagram of an electric brake apparatus for a vehicle according to a second embodiment of the present invention.

In this second embodiment, a brake fluid having an adjusted hydraulic pressure is supplied to the electric caliper 12. Therefore, in this second embodiment, as shown in FIG. 8, a brake hydraulic pressure supply apparatus 60 (brake hydraulic pressure supply means) is provided. The brake hydraulic pressure supply apparatus 60 includes an electric pump 61 driven and controlled by the brake ECU 53 via a drive circuit 55. The bake hydraulic pressure supply apparatus 60 supplies the hydraulic pressure of the brake fluid to the cylinder 31 while adjusting the hydraulic pressure using unillustrated various types of control valves (e.g., a pressure increasing control valve, a pressure reducing control valve, a linear control valve, etc.). Notably, since the specific structure and operation of the brake hydraulic pressure supply apparatus 60 do not directly relate to the present invention, their descriptions are omitted.

Figure 9:
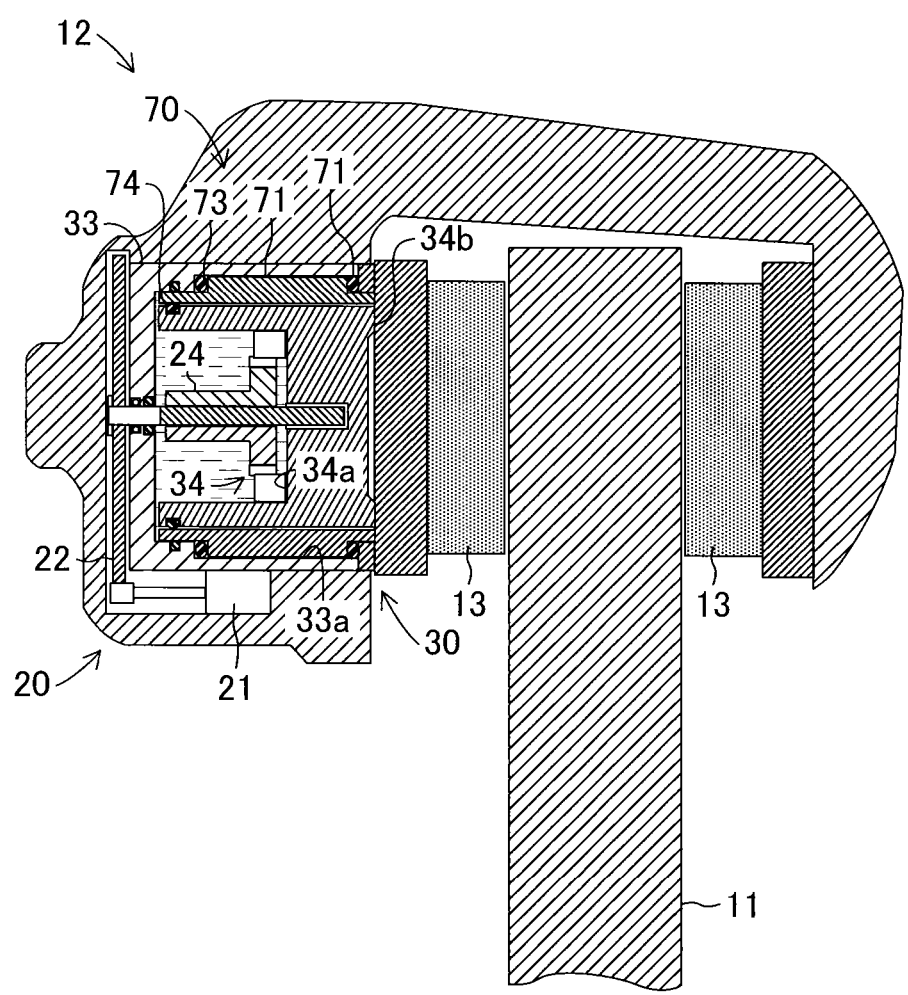
FIG. 9 is a sectional view schematically showing the structure of an electric caliper of FIG. 8.
Figure 10:
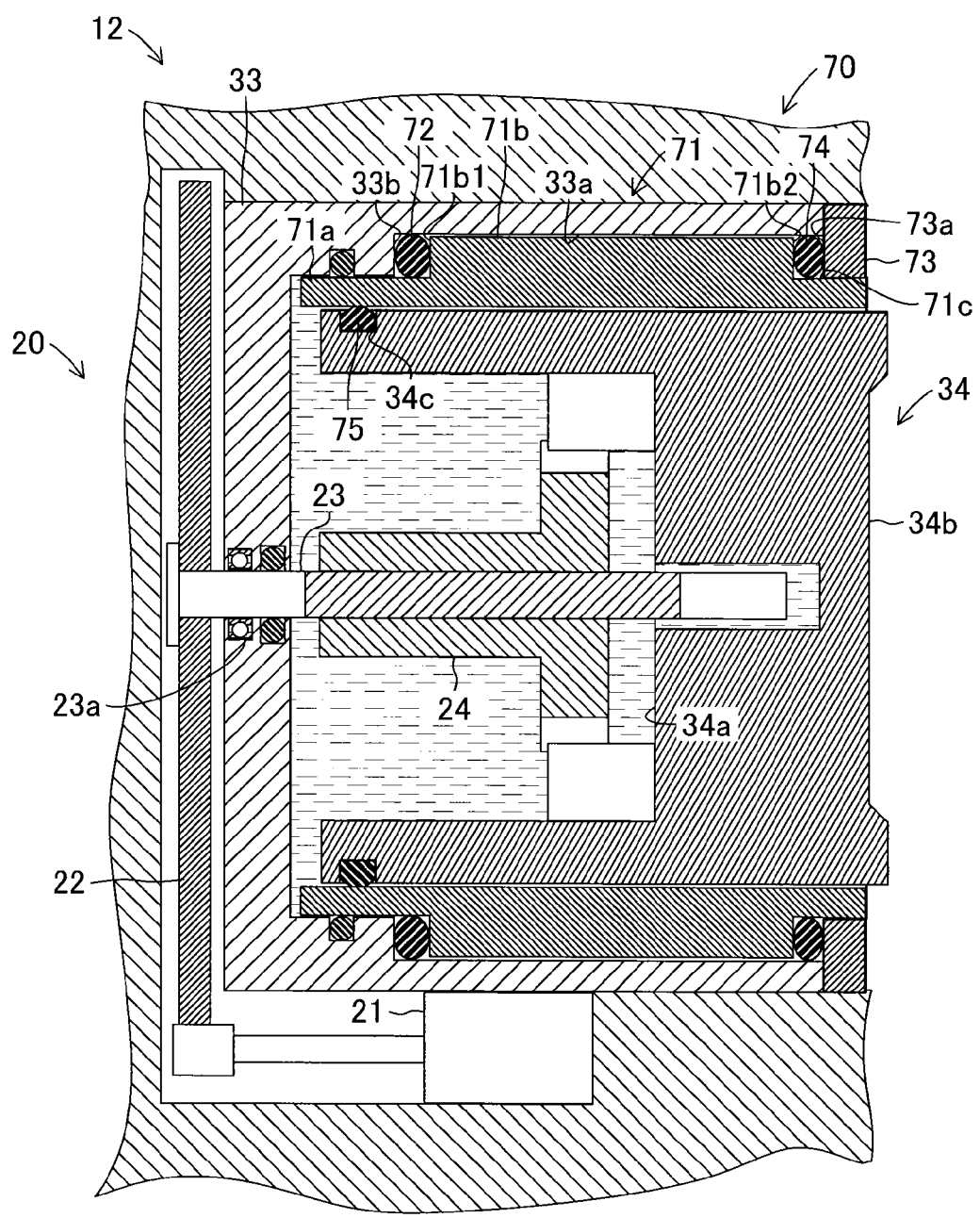
FIG. 10 is a schematic view showing, on an enlarged scale, an electric drive mechanism, a pressing mechanism, and a retraction mechanism of FIG. 9 so as to explain them.

As shown in FIG. 9, the pressing mechanism 30 according to the second embodiment includes a cylinder 33 to which the brake fluid is supplied, and a piston 34 which is liquid-tightly supported within the cylinder 33 such that the piston 34 can advance and retract. As shown in FIG. 10 on an enlarged scale, like the cylinder 31 of the first embodiment, the cylinder 33 is formed into the shape of a cylinder with a bottom, and is non-rotatably assembled to the electric caliper 12. An insertion hole 33a is formed in the bottom wall of the cylinder 33 so as to enable the ball screw 23 of the electric drive mechanism 20 to be passed therethrough. Notably, in this second embodiment, the ball screw 23 penetrates the cylinder 33 in a state in which, in addition to the bearing 23a, a predetermined seal member (e.g., O-ring) is provided between the ball screw 23 and the cylinder 33. Also, a large diameter portion 33a for accommodating a retraction mechanism 70 according to the second embodiment to be described later is formed on the inner circumferential surface of the cylinder 33.

As shown in FIGS. 9 and 10, the piston 34 is formed into the shape of a cylinder having a squarish-C-shaped cross section. The piston 34 can be obtained by uniting the force transmission portion 32a and the pressing portion 32b of the piston 32 of the first embodiment. Therefore, the inner surface side of the bottom wall of the piston 34 serves as a force transmission portion 34a against which the ball nut 24 of the electric drive mechanism 20 butts so as to transmit the pressing force generated by the brake motor 21 to the force transmission portion 34a, and to which a hydraulic pressing force generated by the brake fluid having the adjusted hydraulic pressure is transmitted. Also, the outer surface side of the bottle wall of the piston 34 serves as a pressing portion 34b for pressing the friction pad 13.

Also, in this second embodiment, as shown in FIG. 9, the retraction mechanism 70 is employed in place of the retraction mechanism 40 used in the first embodiment. This retraction mechanism 70 is adapted to return the piston 34 which has been advanced toward the friction pad 13 by the pressing force applied by the electric drive mechanism 20 and the hydraulic pressing force applied as a result of supply of the brake hydraulic pressure to the cylinder 33. For such return operation, the retraction mechanism 70 includes a sleeve-like movable element 71 which is disposed between the inner circumferential surface of the cylinder 33 (more specifically, a large diameter portion 33a thereof) and the outer circumferential surface of the piston 34.

As specifically shown in FIG. 10 on an enlarged scale, the movable element 71 has a first thin wall portion 71a which is accommodated between the inner circumferential surface of the cylinder 33 and the outer circumferential surface of the piston 34 and which receives the brake hydraulic pressure supplied to the cylinder 33; a thick wall portion 71b which is accommodated between the inner circumferential surface of the large diameter portion 33a of the cylinder 33 and the outer circumferential surface of the piston 34; and a second thin wall portion 71c formed on the side toward the open end of the cylinder 33. Notably, a seal member (e.g., O-ring or the like) for preventing leakage of the supplied brake fluid is provided between the outer circumferential surface of the first thin wall portion 71a and the inner circumferential surface of the cylinder 33.

Also, as shown in FIG. 10, the retraction mechanism 70 includes a positioning member 72. This positioning member 72 is accommodated within a space formed by a connection surface 33b connecting the inner circumferential surface of the cylinder 33 and the inner circumferential surface of the large diameter portion 33a, the outer circumferential surface of the first thin wall portion 71a, a first wall surface 71b1 of the first thick wall portion 71b, and the inner circumferential surface of the large diameter portion 33a. The positioning member 72 is formed of a material having a high elasticity (e.g., rubber material or the like) and has a ring-like shape. In the case where the positioning member 72 is elastically deformed by the connection surface 33b and the first wall surface 71b1 when the movable element 71 retracts in order to return the piston 34 as will be described later, the positioning member 72 generates an elastic force corresponding to the elastic deformation and returns the movable element 71 to a predetermined position (initial position).

Also, as shown in FIG. 10, the retraction mechanism 70 includes an annular member 73 fixed to the open end of the cylinder 33; and a reverse restoration member 74 which is accommodated in a space formed by a second wall surface 71b2 of the thick wall portion 71b of the movable element 71, the outer circumferential surface of the second thin wall portion 71c, a facing surface 73a of the annular member 73, and the inner circumferential surface of the large diameter portion 33a. The reverse restoration member 74 is formed of a material having a high elasticity (e.g., rubber material or the like) and has a ring-like shape. When the movable element 71 advances and the reverse restoration member 74 is elastically deformed by the second wall surface 71b2 and the facing surface 73a, the reverse restoration member 74 generates an elastic force (restoring force) corresponding to the elastic deformation in the retraction direction of the piston 34.

Moreover, as shown in FIG. 10, the retraction mechanism 70 includes a frictional seal member 75 accommodated in an accommodation groove 34c formed on the outer circumferential surface of the piston 34. The frictional seal member 75 is formed of an elastic material having a high friction coefficient (e.g., rubber material or the like) and has a ring-like shape. The frictional seal member 75 is accommodated in the accommodation groove 34c so as to apply a predetermined pressing force (i.e., stress) to the inner circumferential surface of the movable element 71. The frictional seal member 75 prevents leakage of the brake fluid supplied to the cylinder 33 and generates a friction force of a predetermined magnitude against displacement of the movable element 71.

Figure 11:
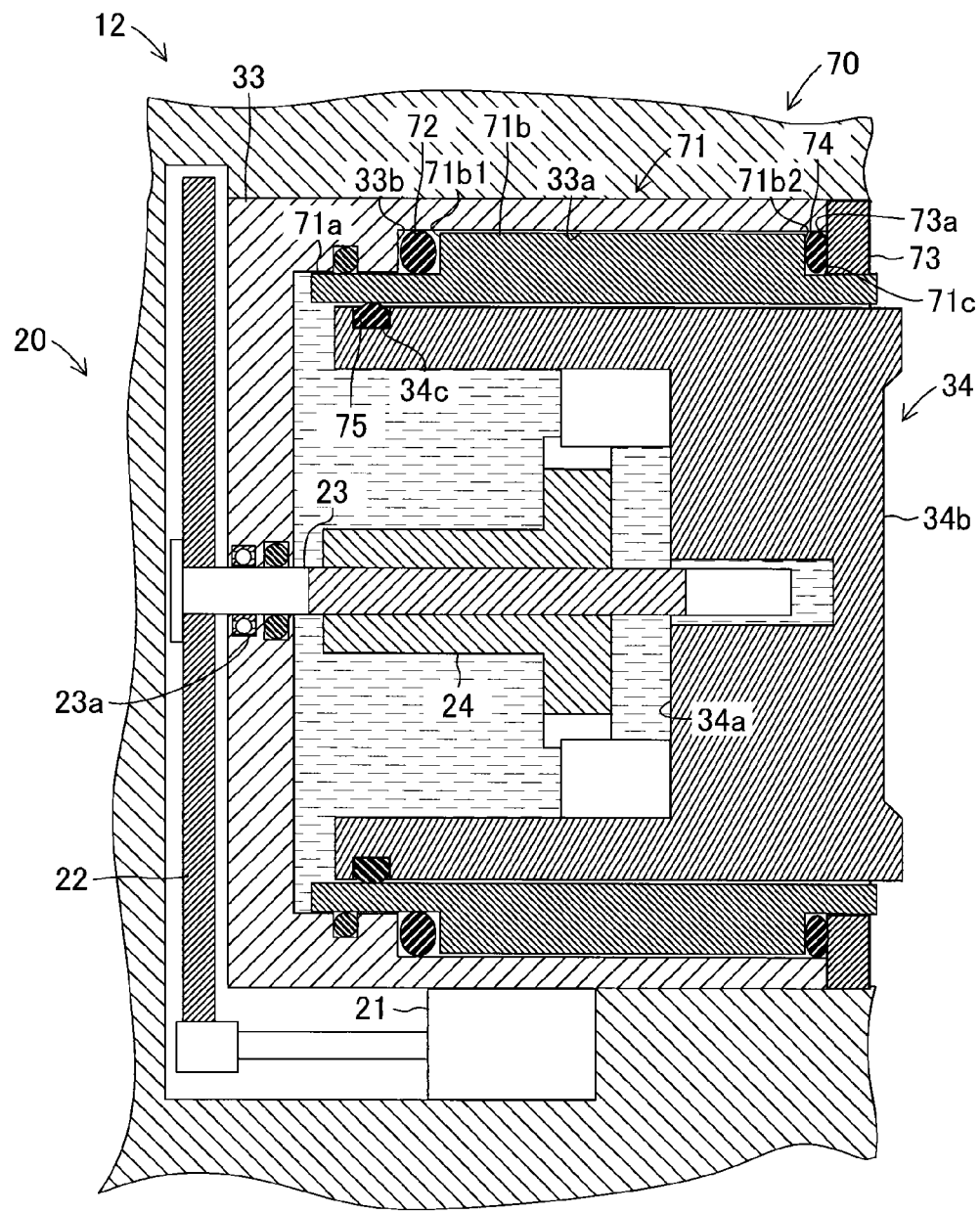
FIG. 11 is a view for explaining that the retraction mechanism returns the piston when a hydraulic pressing force is applied to the piston and the retraction mechanism by a brake hydraulic pressure supply apparatus.

Next, there will be described the basic operation of the retraction mechanism 70 configured as described above. When the brake hydraulic pressure is supplied to the cylinder 33, as shown in FIG. 11, the first thin wall portion 71a of the movable element 71 receives the brake hydraulic pressure, and the movable element 71 advances, in relation to the cylinder 33, toward the friction pad 13 together with the piston 34. As a result, the reverse restoration member 74 is compressed by the advancing second wall surface 71b2 and the facing surface 73a of the annular member 73 unitarily fixed to the cylinder 33. Accordingly, when the reverse restoration member 74 is compressed as a result of supply of the brake hydraulic pressure (namely, an increase in the brake hydraulic pressure), the reverse restoration member 74 generates a reverse force (in other words, a restoring force) which acts in a retraction direction opposite the advancement direction of the movable element 71.

Meanwhile, when the brake hydraulic pressure supplied to the cylinder 33 is decreased, as shown in FIG. 10, the reverse restoration member 74 retracts the movable element 71 with the generated restoring force. At that time, since a friction force is produced between the frictional seal member 75 and the piston 34, the movable element 71 retracts the piston 34 using the restoring force generated by the reverse restoration member 74. When the movable element 71 retracts, the positioning member 72 is compressed by the first wall surface 71b1 and the connection surface 33b. The thus compressed positioning member 72 generates an elastic force so as to return the movable element 71 to the predetermined position (initial position).

Namely, the reverse restoration member 74 of the retraction mechanism 70 exhibits a reverse force generation function of generating a reverse force to be applied to the movable element 71, when the movable element 71 advances as a result of supply of the brake hydraulic pressure, and a restoring force application function of applying to the movable element 71 and the piston 34 an elastic force (restoring force) corresponding to the compression amount. Also, the frictional seal member 75 exhibits a friction force generation function of generating a predetermined friction force between the retracting movable element 71 to be described later and the piston 34.

Accordingly, when the brake hydraulic pressure within the cylinder 33 is increased, as shown in FIG. 11, the retraction mechanism 70 follows the advancement of the piston 34 and generates a reverse force; i.e., restoring force. When the brake hydraulic pressure within the cylinder 33 is decreased, the retraction mechanism 70 can apply the restoring force to the piston 34 as a return force to thereby retract the piston 34 as shown in FIG. 10.

Also, in the electric control apparatus 50 of the second embodiment, as shown in FIG. 8, the load sensor 52 is omitted. Therefore, the brake ECU 53 according to this second embodiment controls operation of the electric drive mechanism 20 on the basis of the depressing force B detected by the brake depressing force sensor 51, as will be described later.

Next, there will be described the operation of the electric brake apparatus according to the second embodiment configured as described above. In this second embodiment, when the brake pedal BP is operated by the driver, the brake hydraulic pressure within the cylinder 33 assembled to the electric caliper 12 increases with the operation of the brake pedal BP. As a result, the force transmission portion 34a of the piston 34 receives the increased brake hydraulic pressure; namely, a hydraulic pressing force is applied to the force transmission portion 34a, whereby the piston 34 advances toward the disc rotor 11. Accordingly, the pressing portion 34b presses the friction pad 13 for pressure contact with the frictional sliding surface of the disc rotor 11.

In this case, in the retraction mechanism 70, as the brake hydraulic pressure within the cylinder 33 increases, the movable element 71 can advance to follow the advancement of the piston 34. As a result, the movable element 71 compresses the reverse restoration member 74 in accordance with the magnitude of the brake hydraulic pressure, and the reverse restoration member 74 generates a restoring force (reverse force) corresponding to the compression amount. When the driver cancels the operation of the brake pedal BP in this state, the brake hydraulic pressure within the cylinder 33 is decreased (released).

When the brake hydraulic pressure within the cylinder 33 is decreased (released) as described above, in the retraction mechanism 70, the advanced movable element 71 retracts due to the reverse force (restoring force) generated by the reverse restoration member 74. At that time, since the frictional seal member 75 generates a predetermined friction force between the movable element 71 and the piston 34, the advanced piston 34 retracts together with the retracting movable element 71. As a result, the friction pad 13 separates from the frictional sliding surface of the disc rotor 11.

Meanwhile, in a situation where the vehicle is parked or stopped, the brake ECU 53 according to the second embodiment drives the brake motor 21 of the electric drive mechanism 20 via the drive circuit 54 so as to maintain a state in which the friction pad 13 is in pressure contact with the frictional sliding surface of the disc rotor 11. Namely, the brake ECU 53 operates the electric drive mechanism 20 so as to start parking brake control when a predetermined condition is satisfied; for example, when the speed of the vehicle is "0," when the driver shifts the gear position of a transmission to the neutral position or the parking position, or when the driver performs a parking brake operation.

Figure 12:
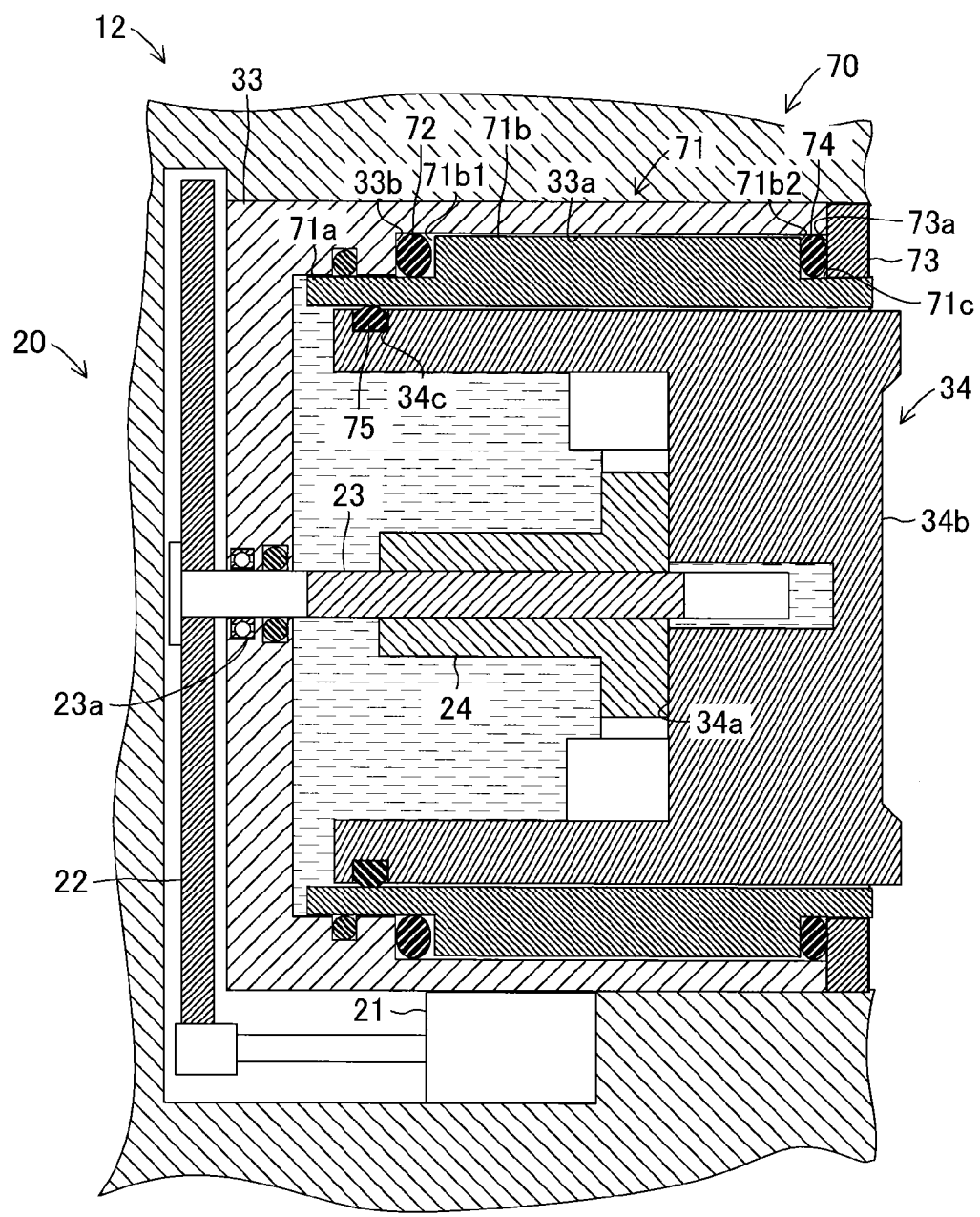
FIG. 12 is a view for explaining a parking brake control of applying a pressing force to the piston by the electric drive mechanism when a vehicle is parked or stopped.

Thus, even when the driver cancels the operation of the brake pedal BP after he or she has parked or stopped the vehicle; in other words, even when the depressing force B detected by the brake depressing force sensor 51 is zero, as shown in FIG. 12, the brake ECU 53 transmits a predetermined pressing force generated by the brake motor 21 to the piston 34 via the ball nut 24. As a result, the piston 34 presses the friction pad 13 against the frictional sliding surface of the disc rotor 11 with a controlled pressing force. Accordingly, when the vehicle is parked or stopped, the brake ECU 53 can maintain the state in which the braking force is applied to the wheel. Notably, in this second embodiment, the brake ECU 53 is configured to cause the brake motor 21 to generate a previously set pressing force; i.e., transmit a controlled pressing force to the piston 34, irrespective of the magnitude of the load F detected by the load sensor 52.

Also, when the pressing force generated by the brake motor 21 is being transmitted to the piston 34, although the movable element 71 of the retraction mechanism 70 does not receive the brake hydraulic pressure, the friction force generated by the frictional seal member 75 enables the movable element 71 to follow the piston 34 and to compress the reverse restoration member 74 to yield an elastic deformation amount less than the maximum elastic deformation amount as shown in FIG. 12. Therefore, in a situation where only the electric drive mechanism 20 operates, the retraction mechanism 70 can apply to the advanced piston 34 a reverse force (restoring force) corresponding to the elastic deformation amount of the reverse restoration member 74 less than the maximum elastic deformation amount.

Figure 13:
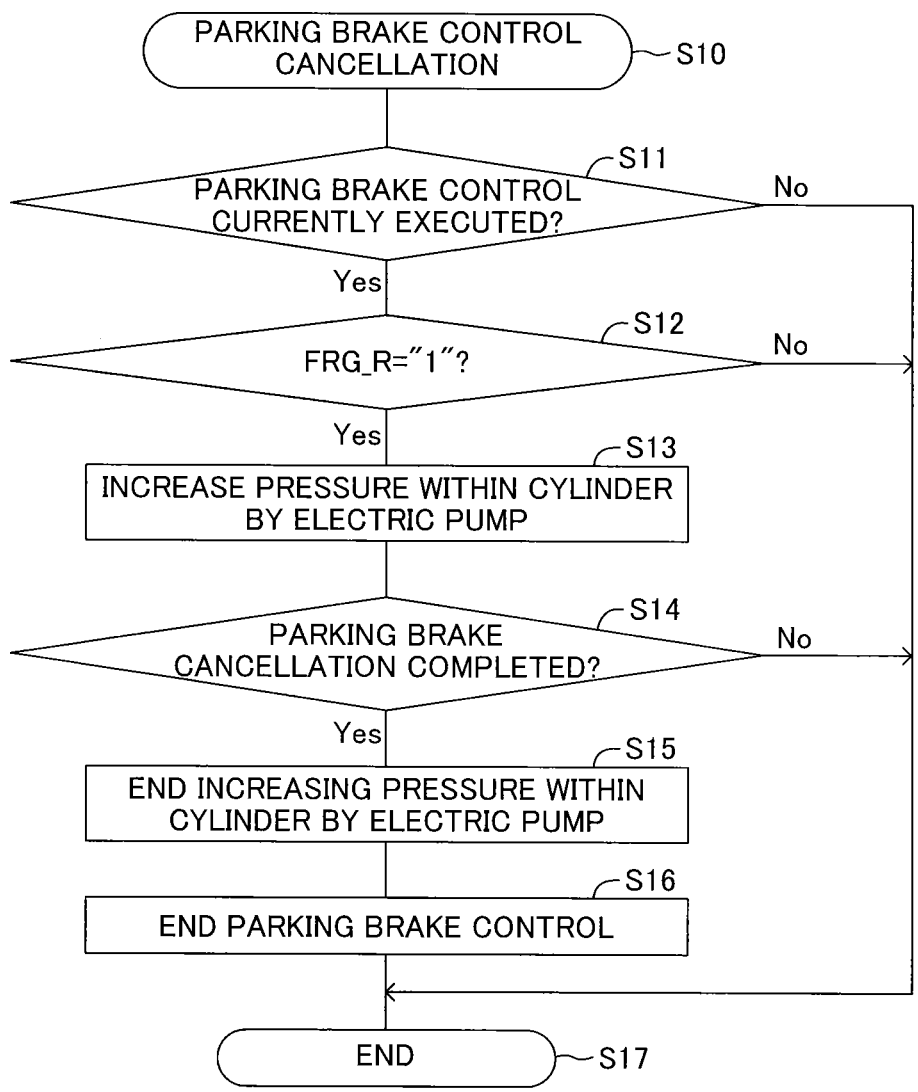
FIG. 13 is a flowchart of a parking brake control cancellation program executed by a brake electronic control unit of FIG. 8.

When the driver starts the vehicle, the brake ECU 53 executes a parking brake control cancellation program shown in FIG. 13 so as to cause the electric drive mechanism 20 to retract the advanced piston 34, to thereby separate the friction pad 13 from the frictional sliding surface of the disc rotor 11. This parking brake control cancellation program will now be described specifically.

The brake ECU 53 starts the parking brake control cancellation program in step S10. In step S11 subsequent thereto, the brake ECU 53 determines whether or not the parking brake control is currently being executed. That is, if the above-described predetermined condition is currently satisfied and the parking brake control is currently being executed, the brake ECU 53 makes a "Yes" determination, and proceeds to step S12. If the execution of the parking brake control has already ended, the brake ECU 53 makes a "No" determination, and proceeds to step S17 so as to end the execution of the parking brake control cancellation program. After elapse of a predetermined short time, the brake ECU 53 again starts the execution of the parking brake control cancellation program in step S10. Notably, when the brake ECU 53 is executing the parking brake control, as shown in the time chart of FIG. 14, the brake ECU 53 sets the value of a parking brake control flag FRG_P, which represents whether or not the parking brake control is being executed, to a "1" indicating that the parking brake control is being executed. When the brake ECU 53 has ended the execution of the parking brake control, the brake ECU 53 sets the value of the parking brake control flag FRG_P to "0" indicating that the parking brake control has been ended.

In step S12, the brake ECU 53 determines whether or not the value of a parking brake control cancellation flag FRG_R, which represents whether or not a predetermined cancellation condition is satisfied, is set to "1" indicating that the cancellation condition is satisfied. The predetermined cancellation condition is satisfied, for example, when the driver operates an unillustrated accelerator pedal for accelerating the vehicle, when the driver shifts the gear position of the transmission to a position other than the neutral position and the parking position, or when the driver performs an operation of cancelling the parking brake. Namely, if the value of the parking brake control cancellation flag FRG_R is "1," the brake ECU 53 makes a "Yes" determination, and proceeds to step S13.

Figure 14:
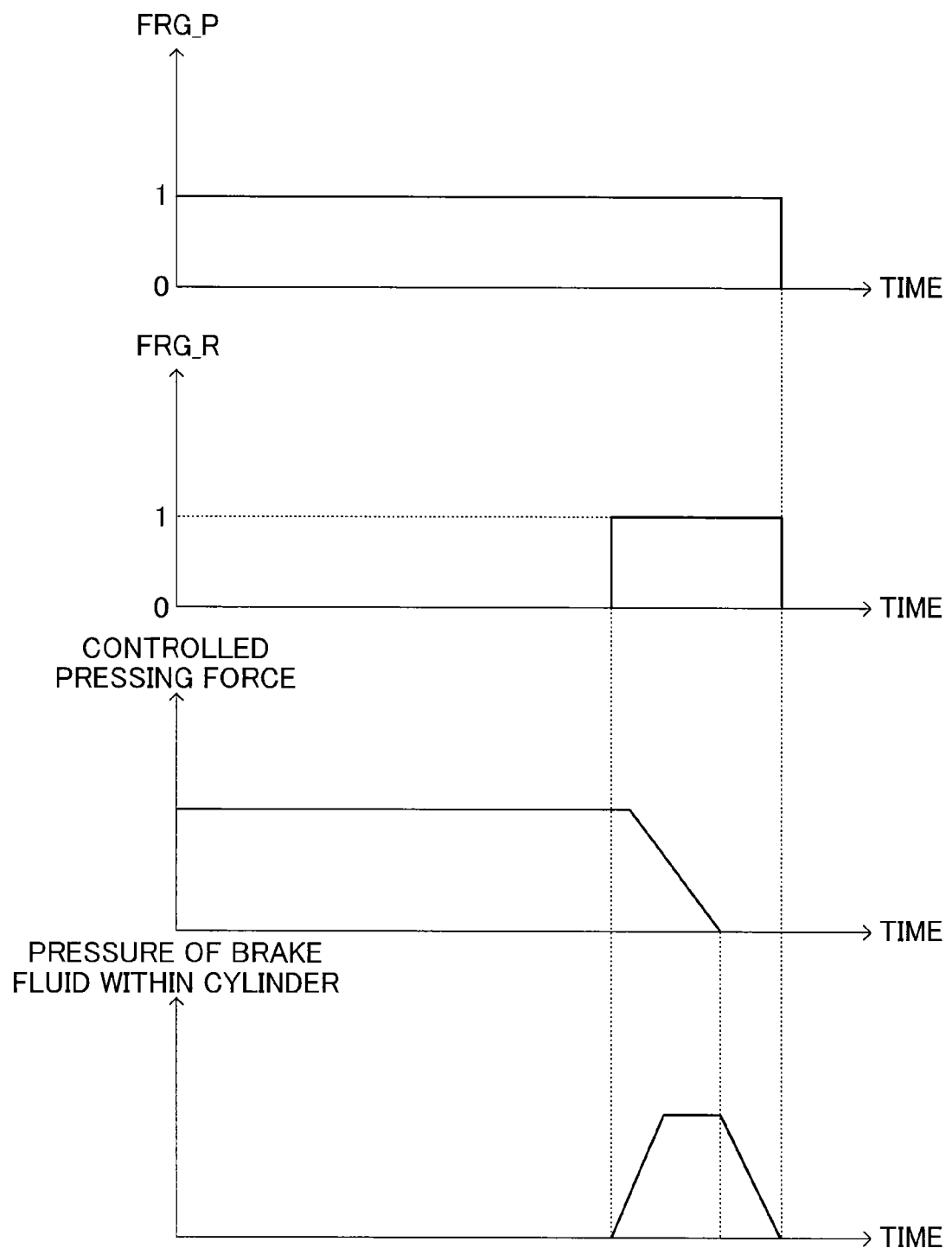
FIG. 14 is a time chart showing changes, with respect to time, of a parking brake control flag, a parking brake control cancellation flag, controlled pressing force, and brake hydraulic pressure within the cylinder.

As shown in the time chart of FIG. 14, in the case where the value of the parking brake control cancellation flag FRG_R is set to "1," the brake ECU 53 turns off (opens) the switching elements SWu, SWv, and SWw of the drive circuit 54 as in the case of the above-described first embodiment, so as to stop the supply of current (electric power) from the battery Batt to the brake motor 21, to thereby permit free rotation (no-load rotation) of the brake motor 21. As a result, as shown in FIG. 14, the controlled pressing force with which the piston 34 presses the friction pad 13 against the frictional sliding surface of the disc rotor 11 decreases with elapse of time.

Meanwhile, in the case where the value of the parking brake control cancellation flag FRG_R is set to "0" indicating that the cancellation condition is not satisfied, the brake ECU 53 makes a "No" determination so as to continue the execution of the parking brake control. In this case, the brake ECU 53 proceeds to step S17 so as to end the execution of the parking brake control cancellation program. After elapse of the predetermined short time, the brake ECU 53 again starts the execution of the parking brake control cancellation program in step S10.

In step S13, in order to retract the piston 34 having advanced to press the friction pad 13, the brake ECU 53 drives the electric pump 61 of the brake hydraulic pressure supply apparatus 60, to thereby increase the brake hydraulic pressure within the cylinder 33. Namely, the brake ECU 53 drives and controls the drive circuit 55 so as to supply a predetermined drive current to the electric pump 61. As a result, as shown in the time chart of FIG. 14, the brake hydraulic pressure within the cylinder 33 is increased to a predetermined hydraulic pressure through drive of the electric pump 61.

Figure 15:
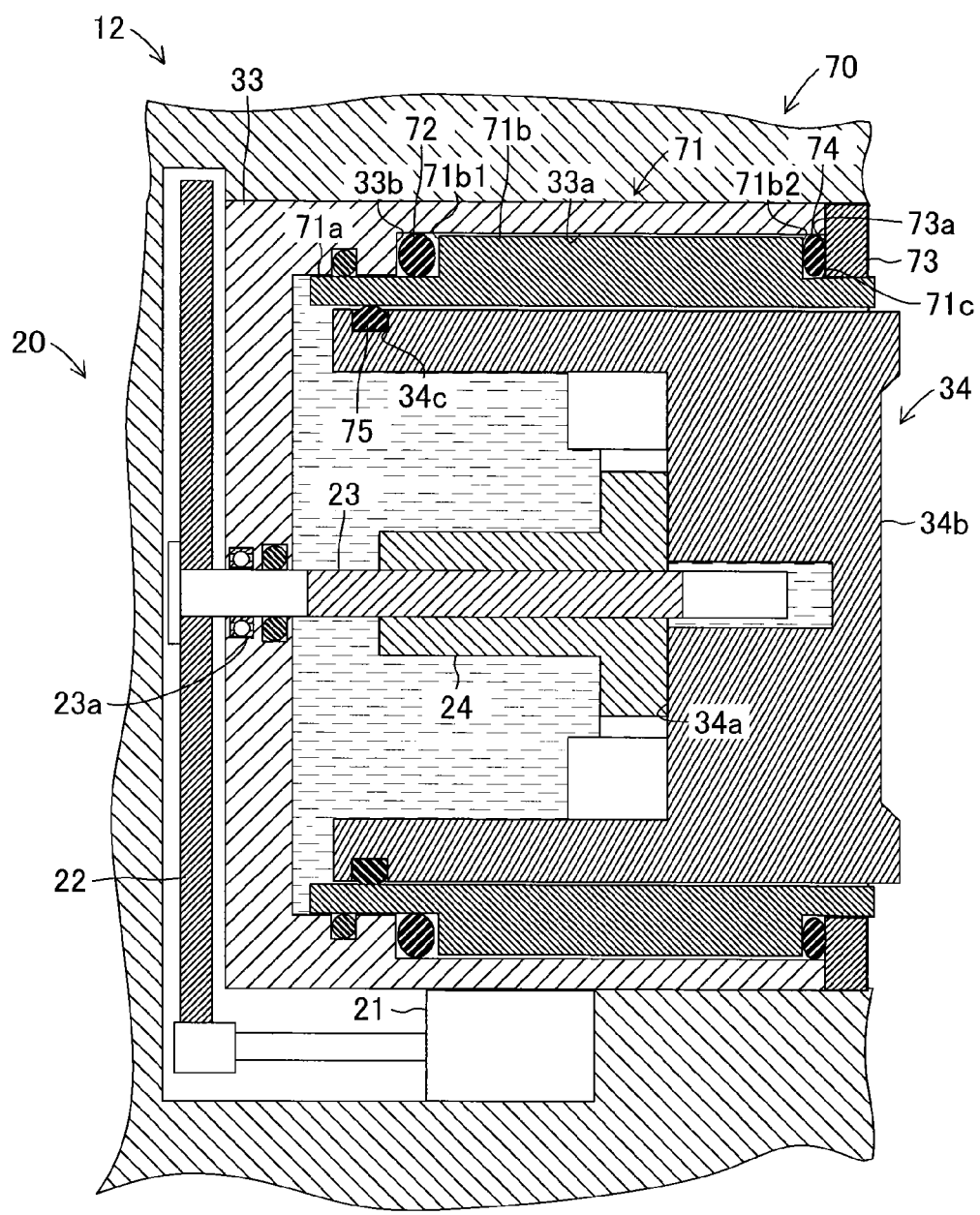
FIG. 15 is a view for explaining that, when the parking brake control is canceled, upon application of a hydraulic pressing force, the retraction mechanism returns the piston.

As a result, as shown in FIG. 15, the movable element 71 of the retraction mechanism 70 advances upon reception of the increased brake hydraulic pressure within the cylinder 33, and compress and elastically deforms the reverse restoration member 74 as described above so that the maximum elastic deformation amount is attained. After driving the electric pump 61 of the brake hydraulic pressure supply apparatus 60, the brake ECU 53 proceeds to step S14.

In step S14, the brake ECU 53 determines whether or not the brake motor 21, whose free rotation (no-load rotation) has been permitted in the above-described step S12, is in a free rotation (no-load rotation) state; in other words, whether or not the controlled pressing force becomes substantially "0" as shown in FIG. 14 and the cancellation of the parking brake has been completed. Notably, the brake ECU 53 executes this determination processing through use of current values detected by ammeters provided in the drive circuit 54, the current values representing the currents of the three phases.

Namely, if the brake motor 21 has entered the free rotation (no-load rotation) state and the controlled pressing force is substantially "0," the brake ECU 53 makes a "Yes" determination, and proceeds to step S15. In contrast, if the brake motor 21 has not yet entered the free rotation (no-load rotation) state and the controlled pressing force is not substantially "0," the brake ECU 53 makes a "No" determination, and proceeds to step S17 so as to end the execution of the parking brake control cancellation program. After elapse of the predetermined short time, the brake ECU 53 again starts the execution of the parking brake control cancellation program in step S10.

In step S15, the brake ECU 53 drives and controls the drive circuit 55 so as to stop the supply of drive current to the electric pump 61 of the brake hydraulic pressure supply apparatus 60, to thereby stop the drive of the electric pump 61. As a result, as shown in FIG. 14, the brake hydraulic pressure within the cylinder 33 is decreased at a fixed rate.

Incidentally, when the brake hydraulic pressure within the cylinder 33 is increased and then decreased in this manner, as described above, the movable element 71 is retracted by the reverse force (restoring force) generated by the reverse restoration member 74 having elastically deformed to yield the maximum elastic deformation amount. Since the frictional seal member 75 is generating a predetermined friction force between the movable element 71 and the piston 34, the advanced piston 34 can retract together with the retracting movable element 71 by a retraction amount corresponding to the elastic deformation amount of the reverse restoration member 74. Accordingly, as shown in FIG. 9, the friction pad 13 can separate from the frictional sliding surface of the disc rotor 11 by an amount corresponding to a proper clearance.

After stopping the drive of the electric pump 61 of the brake hydraulic pressure supply apparatus 60, the brake ECU 53 proceeds to step S16 so as to end the execution of the parking brake control. At that time, the brake ECU 53 sets the value of the parking brake control flag FRG_P to "0" indicating that the parking brake control has ended. Subsequently, in step S17, the brake ECU 53 ends the execution of the parking brake control cancellation program. After elapse of the predetermined short time, the brake ECU 53 again starts the execution of the parking brake control cancellation program in step S10.

As can be understood from the above description, in the retraction mechanism 70 according to this second embodiment, when free rotation (no-load rotation) of the brake motor 21 of the electric drive mechanism 20 is permitted by the brake ECU 53, the reverse restoration member 74 can properly return the advanced piston 34 by a predetermined amount (retraction amount) through use of a restoring force (reverse force) which is obtained by reversing the hydraulic pressing force generated by the brake hydraulic pressure supplied to the cylinder 33.

Specifically, in this second embodiment, when the parking brake control is cancelled, the brake ECU 53 permits free rotation (no-load rotation) of the brake motor 21, and drives the electric pump 61 of the brake hydraulic pressure supply apparatus 60 with a predetermined drive current set in advance so as to increase the brake hydraulic pressure within the cylinder 33. Subsequently, the brake ECU 53 decreases (releases) the brake hydraulic pressure within the cylinder 33. With this operation, the reverse restoration member 74 of the retraction mechanism 70 can be elastically deformed without fail. In the retraction mechanism 70, as a result of retraction of the movable element 71 to which the restoring force (reverse force) is transmitted from the reverse restoration member 74, the piston 34 can be retracted by a predetermined amount (retraction amount).

Accordingly, in this second embodiment as well, the friction pad 13 can be separated from the frictional sliding surface of the disc rotor 11 by an amount corresponding to a proper clearance. Therefore, occurrence of the above-mentioned dragging phenomenon can be prevented without fail. Also, since the brake ECU 53 is not required to separately control the brake motor 21 in the reverse direction in order to retract the advanced piston 32, the drive control of the brake motor 21 can be simplified. Also, since the advanced piston 34 can be retracted by the restoring force (reverse force) mechanically generated by the retraction mechanism 70, it is unnecessary to supply electric power to the brake motor 21, whereby energy saving can be achieved.

c. Modifications

Figure 16:
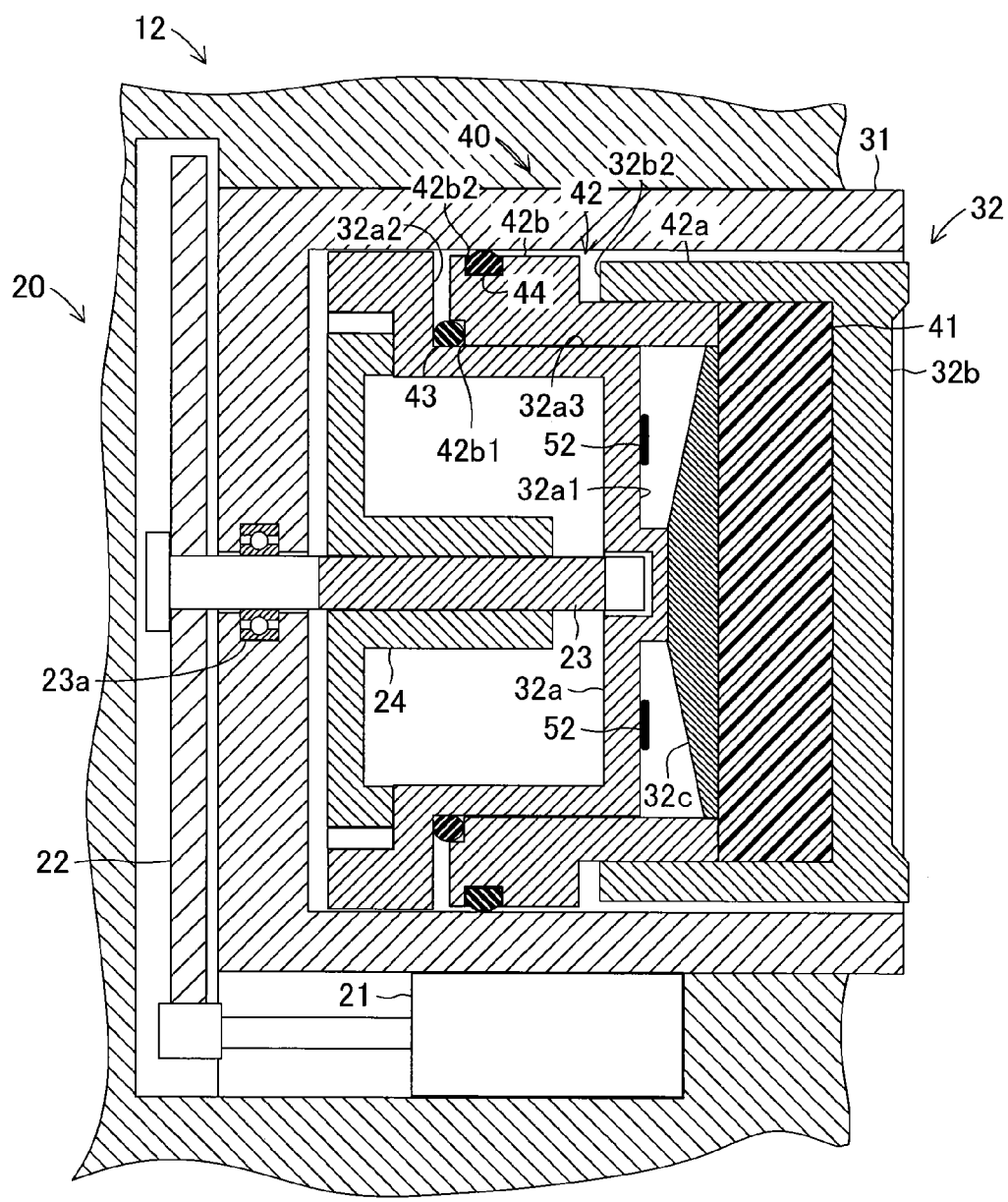
FIG. 16 is a schematic view showing a first modification of the present invention.

In the above-described first embodiment, the load sensor 52, which constitutes the electric control apparatus 50, is assembled to the large diameter portion 24a of the ball nut 24, which constitutes the electric drive mechanism 20, and the load sensor 52 detects a distortion of the large diameter portion 24a generated upon transmission of the pressing force generated by the brake motor 21 and outputs a load F determined from the distortion. In this case, in order to improve the detection accuracy of the distortion; in other words, the detection accuracy of the load F, the first embodiment may be modified such that the piston 32 is configured as shown in FIG. 16 and the load sensor 52 is assembled to the first step portion 32a1 of the force transmission portion 32a.

This first modification will be described specifically. As shown in FIG. 16, a conical member 32c having a generally trapezoidal cross section is provided between the force transmission portion 32a of the piston 32 and the reversing member 41 of the retraction mechanism 40 such that a distal end portion of the force transmission portion 32a butts against a distal end portion of the conical member 32c. The load sensor 52 is assembled to the first step portion 32a1 of the force transmission portion 32a. By virtue of this configuration, when the force transmission portion 32a advances due to the pressing force transmitted thereto via the ball nut 24, the force transmission portion 32a presses the reversing member 41 and the pressing portion 32b through the conical member 32c. At that time, since the distal end portion of the force transmission portion 32a and the distal end portion of the conical member 32c butt against each other, the reaction force generated when the force transmission portion 32a transmits a pressing force to the reversing member 41 and the pressing portion 32b is efficiently input to the force transmission portion 32a. This input reaction force easily deforms (distorts) the first step portion 32a1 of the force transmission portion 32a. As a result, the load sensor 52 can detect the generated distortion more easily. Accordingly, the load sensor 52 can output to the brake ECU 53 a signal which represents a more accurate load F corresponding to the easily detected distortion.

Figure 17:
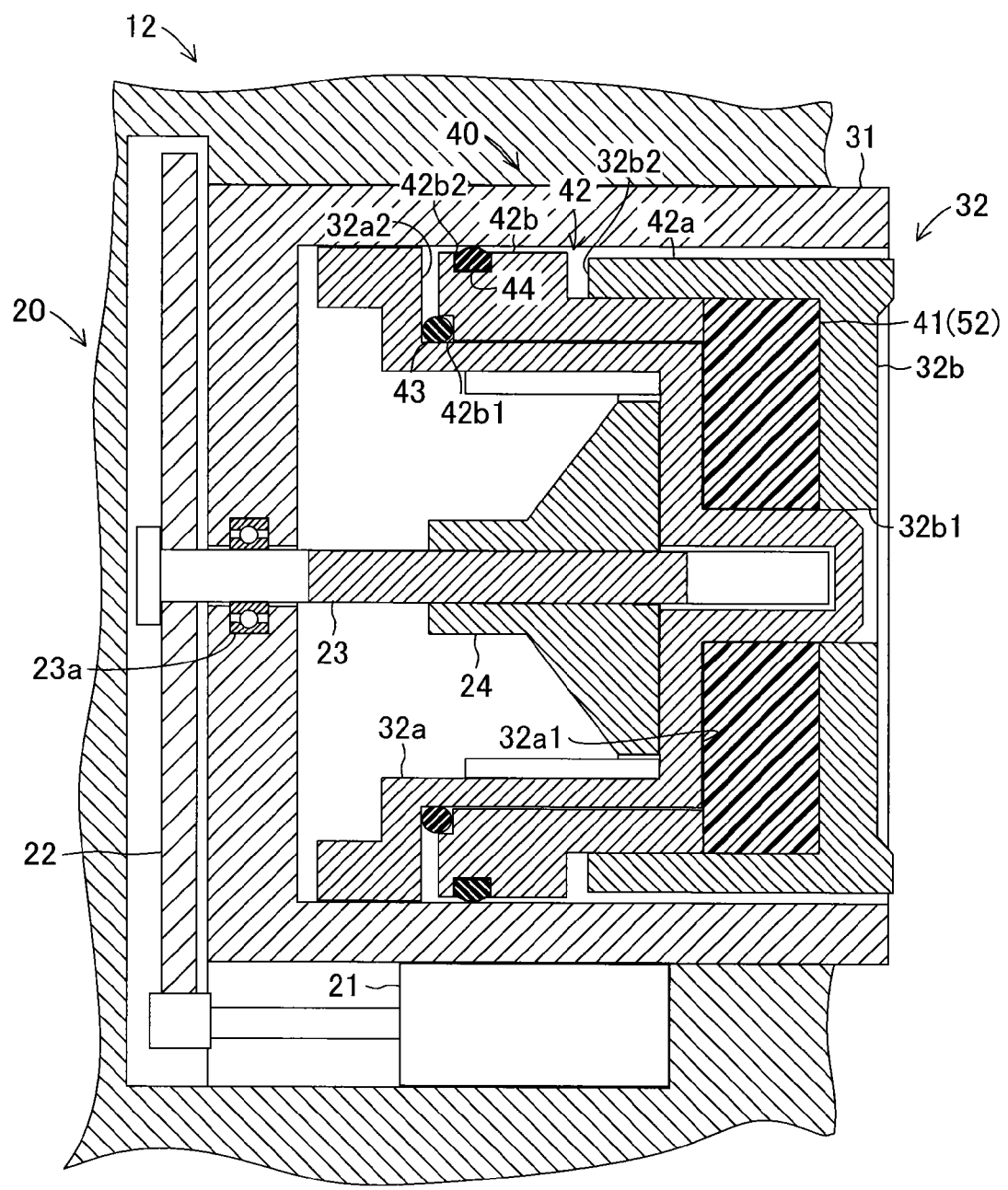
FIG. 17 is a schematic view showing a second modification of the present invention.

In the above-described first embodiment, the load sensor 52, which constitutes the electric control apparatus 50, detects the distortion generated in the ball nut 24, and outputs to the brake ECU 53 the load F corresponding to the detected distortion. The first embodiment may be modified as shown in FIG. 17. Specifically, the reversing member 41 is formed of a pressure sensitive rubber which deforms upon application of a pressure thereto, and whose resistance changes in accordance with a distortion generated due to the deformation. The resistance of the pressure sensitive rubber (reversing member 41) which changes as a result of deformation thereof is detected, and a load F corresponding to the resistance is output to the brake ECU 53. In this second modification, since the reversing member 41 and the load sensor 52 can be formed unitarily, the load sensor 52 is not required to be provided separately. Also, since the shape of the ball nut 24 can be simplified, the configuration of the electric brake apparatus can be simplified.

Figure 18:
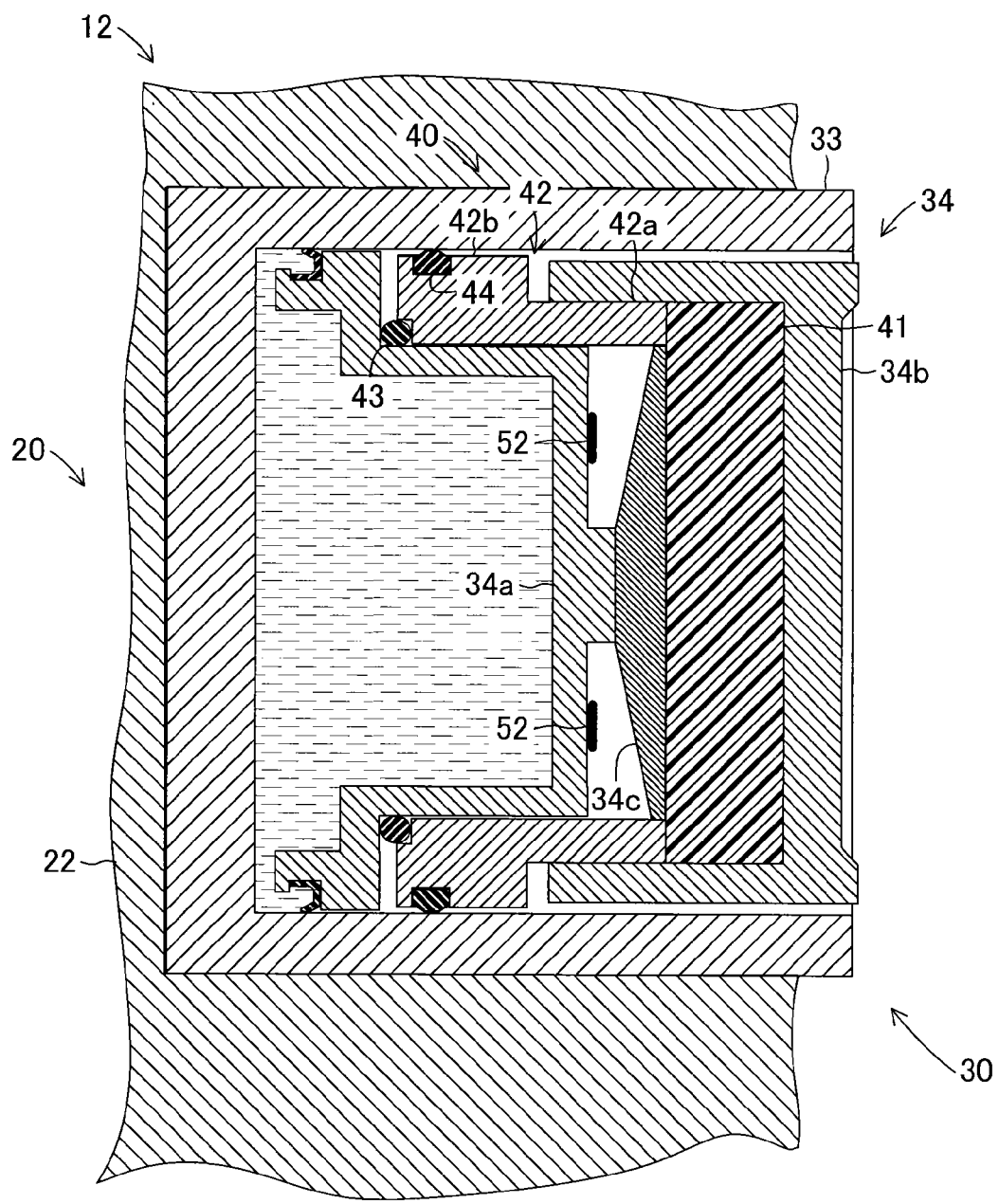
FIG. 18 is a schematic view showing a third modification of the present invention.
Figure 19:
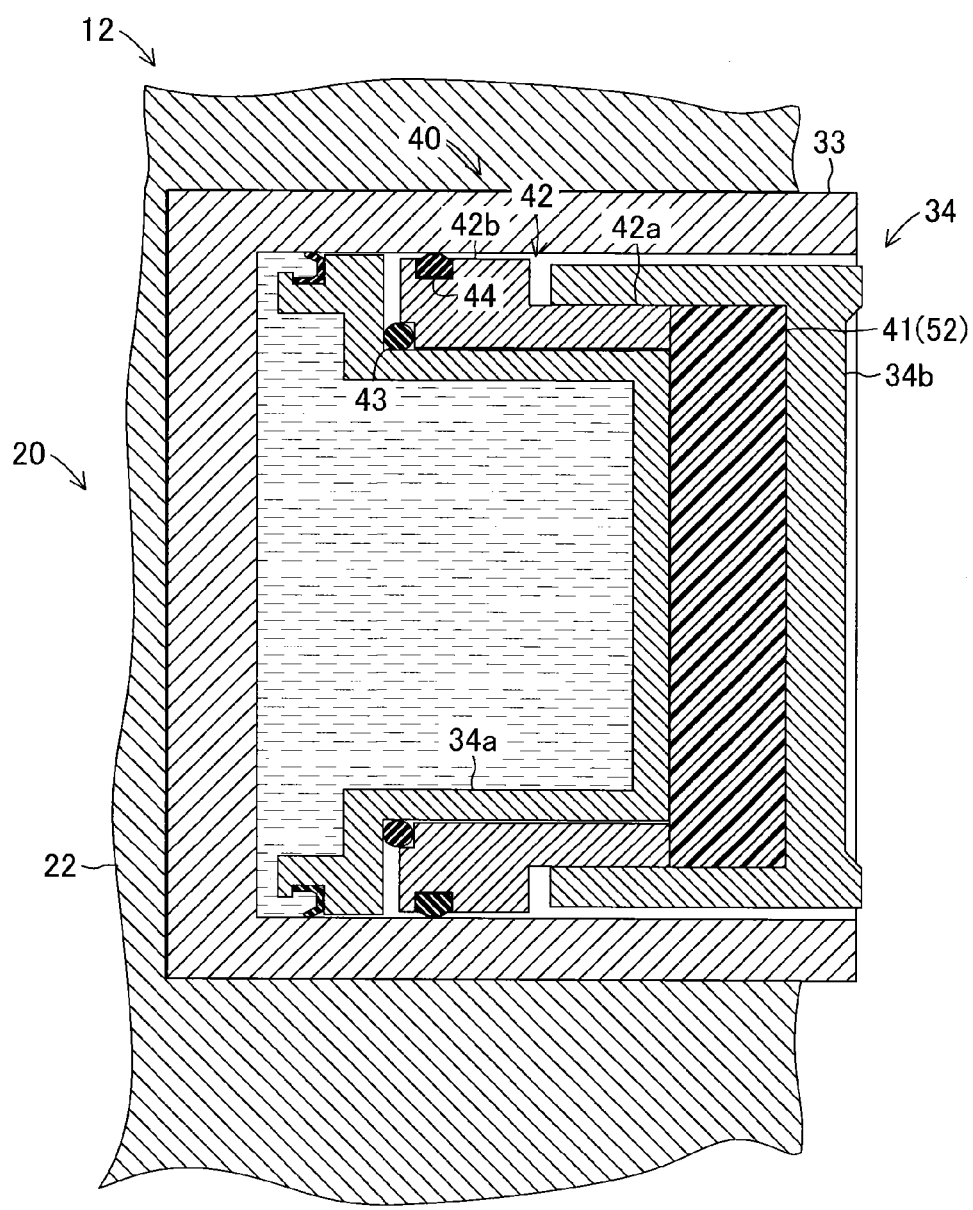
FIG. 19 is a schematic view showing the third modification of the present invention.

The above-described second embodiment is configured such that brake fluid can be supplied to the cylinder 33 of the electric caliper 12, and a hydraulic pressing force is applied to the piston 34, by increasing and decreasing the brake hydraulic pressure within the cylinder 33, to thereby apply a predetermined braking force to a rotating wheel. In the case where a predetermined braking force is applied through utilization of the brake hydraulic pressure (hydraulic pressing force) as described above, the load sensor 52 may be provided if necessary as shown in FIGS. 18 and 19. FIG. 18 schematically shows a configuration which includes the retraction mechanism 40 and the load sensor 52 which detects the distortion generated in the force transmission portion 34a and outputs the load F as in the case of the first modification shown in FIG. 16. FIG. 19 schematically shows a configuration in which the reversing member 41 of the retraction mechanism 40 is formed of a pressure sensitive rubber, and the load sensor 52 is provided in order to detect the resistance of the reversing member 41 which changes with deformation thereof and output the load F as in the case of the second modification shown in FIG. 17.

In this third modification, since the brake hydraulic pressure supplied to the cylinder 33 (hydraulic pressing force) can be detected by a simple configuration, a predetermined braking force can be applied to a rotating wheel more properly through utilization of the brake hydraulic pressure (hydraulic pressing force). Also, in the case where the advanced piston 34 is retracted by the retraction mechanism 70 operated by supplying the brake hydraulic pressure (hydraulic pressing force) as having being explained in, for example, the above-described second embodiment, the electric pump 61 can be properly operated on the basis of the detected load F; i.e., the brake hydraulic pressure (hydraulic pressing force). Accordingly, when the parking brake control is cancelled, the advanced piston 34 can be retracted more reliably, and occurrence of the above-mentioned dragging phenomenon between the disc rotor 11 and the friction pad 13 can be restrained.

The present invention is not limited to the above-described embodiments and modifications, and may be changed in various ways without departing from the object of the present invention.

For example, in the above-described embodiments and modifications, the retraction mechanism 40 or the retraction mechanism 70 is applied to the electric caliper 12 which is configured such that only one of the two friction pads 13 is pressed by the piston 32 or the piston 34. However, the retraction mechanism 40 or the retraction mechanism 70 can be implemented through use of an electric caliper 12 which includes pistons 32 or pistons 34 for pressing the two friction pads 13 individually. In such a case, the retraction mechanism 40 or the retraction mechanism 70 configured in the same manner as in the above-described embodiments and modifications is provided for each of the pistons 32 or pistons 34 which press the corresponding friction pads 13. In this case as well, effects similar to those attained by the above-described embodiments and modifications are obtained.

The invention claimed is:

1. An electric brake apparatus for a vehicle, comprising:
a brake rotation body which rotates together with a wheel;
an electric caliper which includes a piston for pressing a brake friction member, facing a frictional sliding surface of the brake rotation body, toward the frictional sliding surface, a cylinder accommodating the piston such that the piston can advance and retract, and electric drive means for applying to the piston a pressing force for pressing the brake friction member;
free rotation permission means for permitting free rotation of an electric motor which constitutes the electric drive means and which generate the pressing force for advancing the piston; and
retraction means including reversing means for reversing the pressing force applied to the piston by the electric drive means so as to provide a reverse force which acts in a retraction direction of the piston, wherein
when free rotation of the electric motor generating the pressing force is permitted by the free rotation permission means, the retraction means retracts the piston having advanced so as to press the brake friction member, through use of the reverse force provided by the reversing means,
the piston is composed of a force transmission portion to which the pressing force generated by the electric drive means is transmitted, and a pressing portion which presses the brake friction member;
the reversing means is disposed between the force transmission portion and the pressing portion; and
the retraction means is configured such that, when free rotation of the electric motor generating the pressing force is permitted by the free rotation permission means, the retraction means unitarily retracts the force transmission portion and the pressing portion, which have advanced so as to press the brake friction member, by applying to the force transmission portion the reverse force provided by the reversing means.

2. An electric brake apparatus for a vehicle according to claim 1, wherein the reversing means is viscoelastically deformed by advancement of the piston, whereby the reversing means reverses the pressing force to provide the reverse force.

3. An electric brake apparatus for a vehicle according to claim 1, wherein the retraction means includes:
reverse force transmission means for transmitting the reverse force provided by the reversing means in the retraction direction of the piston, and
restoring force application means which is deformed by the reverse force transmission means as a result of advancement of the piston by the pressing force and which applies to the piston a restoring force generated as a result of the deformation.

4. An electric brake apparatus for a vehicle according to claim 3, wherein the restoring force application means is formed of an elastic material which is compressed and elastically deformed by the reverse force transmission means as a result of advancement of the piston by the pressing force.

5. An electric brake apparatus for a vehicle according to claim 1, wherein the electric brake apparatus is used as an electric parking brake apparatus which operates when the vehicle is parked or stopped so as to brake rotation of the wheel.

6. An electric brake apparatus for a vehicle according to claim 5, further comprising brake hydraulic pressure supply means for supplying a brake fluid to the cylinder of the electric caliper so as to increase or decrease a brake hydraulic pressure within the cylinder to thereby apply a hydraulic pressing force to the piston, wherein
when the brake rotation body rotates together with the wheel, the piston presses the brake friction member toward the frictional sliding surface of the brake rotation body through use of the hydraulic pressing force which is applied to the piston as a result of the brake hydraulic pressure within the cylinder being increased by the brake hydraulic pressure supply means, and when the brake rotation body stops its rotation together with the wheel, the piston presses the brake friction member toward the frictional sliding surface of the brake rotation body through use of the pressing force applied by the electric drive means;
the reversing means of the retraction means reverses the hydraulic pressing force applied by the brake hydraulic pressure supply means or the pressing force applied by the electric drive means so as to provide the reverse force which acts in the retraction direction of the piston; and
the retraction means is configured such that, when the brake hydraulic pressure within the cylinder is decreased by the brake hydraulic pressure supply means or when free rotation of the electric motor is permitted by the free rotation permission means, the retraction means retracts the piston having advanced to press the brake friction member, through use of the reverse force provided by the reversing means.

7. An electric brake apparatus for a vehicle according to claim 6, wherein the brake hydraulic pressure supply means decreases the brake hydraulic pressure within the cylinder after increasing the brake hydraulic pressure, when free rotation of the electric motor is permitted by the free rotation permission means.

8. An electric brake apparatus for a vehicle according to claim 1, further comprising load detection means for detecting a load corresponding to a distortion generated due to the pressing force applied from the electric drive means to the piston.

9. An electric brake apparatus for a vehicle according to claim 8, wherein
the electric drive means includes pressing force transmission means for transmitting the pressing force generated by the electric motor to the piston; and
the load detection means is provided on the pressing force transmission means.

10. An electric brake apparatus for a vehicle according to claim 9, wherein the load detection means detects the load corresponding to the distortion generated in the pressing force transmission means when the pressing force transmission means transmits the pressing force to the piston.

11. An electric brake apparatus for a vehicle according to claim 8, wherein the load detection means is a pressure sensitive rubber which deforms due to the pressing force transmitted from the electric drive means to the piston and whose resistance changes in accordance with the distortion generated due to the deformation, and a load corresponding to the resistance which changes due to the deformation is detected.

12. An electric brake apparatus for a vehicle according to claim 3, wherein the retraction means further includes deformation maintaining means for maintaining the deformation of the restoring force application means when free rotation of the electric motor generating the pressing force is permitted by the free rotation permission means.

13. An electric brake apparatus for a vehicle according to claim 12, wherein the deformation maintaining means is provided on the reverse force transmission means and generates a friction force for maintaining a state in which the reverse force is transmitted by the reverse force transmission means.

14. An electric brake apparatus for a vehicle according to claim 1, wherein
the free rotation permission means permits free rotation of the electric motor upon cancellation of a brake operation for pressing the brake friction member toward the frictional sliding of the brake rotation body; and
the retraction means is configured such that, when free rotation of the electric motor is permitted by the free rotation permission means upon cancellation of the brake operation, the retraction means retracts the piston having advanced to press the brake friction member, through use of the reverse force provided by the reversing means.

15. An electric brake apparatus for a vehicle according to claim 4, wherein the retraction means further includes deformation maintaining means for maintaining the deformation of the restoring force application means when free rotation of the electric motor generating the pressing force is permitted by the free rotation permission means.

16. An electric brake apparatus for a vehicle according to claim 15, wherein the deformation maintaining means is provided on the reverse force transmission means and generates a friction force for maintaining a state in which the reverse force is transmitted by the reverse force transmission means.

17. An electric brake apparatus for a vehicle, comprising:
a brake rotation body which rotates together with a wheel;
an electric caliper which includes a piston for pressing a brake friction member, facing a frictional sliding surface of the brake rotation body, toward the frictional sliding surface, a cylinder accommodating the piston such that the piston can advance and retract, and an electric motor that applies to the piston a pressing force for pressing the brake friction member; and
a retraction mechanism including a reversing member that reverses the pressing force applied to the piston by the electric motor so as to provide a reverse force which acts in a retraction direction of the piston, wherein
the piston includes a force transmission portion to which the pressing force generated by the electric drive means is transmitted, and a pressing portion which presses the brake friction member, and
the reversing member is disposed between the force transmission portion and the pressing portion.

* * * * *